(12) United States Patent
Bokowski et al.

(10) Patent No.: US 11,998,828 B2
(45) Date of Patent: Jun. 4, 2024

(54) METHOD AND SYSTEM FOR PRESENTING GAME-RELATED INFORMATION

(71) Applicant: Scorevision, LLC, Omaha, NE (US)

(72) Inventors: Chad Bokowski, Omaha, NE (US); David Sutter, Omaha, NE (US); Corey Spitzer, Omaha, NE (US); Gordon Whitten, Omaha, NE (US); Michael Medrano, Omaha, NE (US)

(73) Assignee: Scorevision, LLC, Omaha, NE (US)

( * ) Notice: Subject to any disclaimer, the term of this patent is extended or adjusted under 35 U.S.C. 154(b) by 864 days.

(21) Appl. No.: 17/063,215

(22) Filed: Oct. 5, 2020

(65) Prior Publication Data

US 2021/0016151 A1 Jan. 21, 2021

Related U.S. Application Data

(63) Continuation-in-part of application No. 15/484,891, filed on Apr. 11, 2017, now Pat. No. 11,520,741, and
(Continued)

(51) Int. Cl.
*H04N 21/81* (2011.01)
*A63B 71/06* (2006.01)
(Continued)

(52) U.S. Cl.
CPC .......... *A63B 71/0669* (2013.01); *H04N 21/84* (2013.01)

(58) Field of Classification Search
CPC . A63B 71/06; A63B 71/0619; A63B 71/0622; A63B 71/0669;
(Continued)

(56) References Cited

U.S. PATENT DOCUMENTS 6,630,963 B1 10/2003 Billmaier
6,810,397 B1 10/2004 Qian et al.
(Continued)

OTHER PUBLICATIONS

Office Action in Canadian Application No. 2980501 dated Dec. 16, 2022, 3 pages.
(Continued)

*Primary Examiner* — Lawrence S Galka
(74) *Attorney, Agent, or Firm* — Suiter Swantz IP

(57) ABSTRACT

The present application is a method and system for presenting game-related information. A system for presenting game-related information may include an initiator device, the initiator device including a computing device which includes an application executed by a processor of the computing devices to generate game-related information, a display device operably connected to the initiator device to display game-related information from the initiator device, and a cloud-based server device operably connected to the initiator device for receipt of the game-related information. The system for presenting game related information may include a receiver device, the receiver device including a computing device which includes an application executed by a processor of the computing device to receive the game-related information from the cloud-based server device.

5 Claims, 27 Drawing Sheets

Related U.S. Application Data a continuation-in-part of application No. 15/076,133, filed on Mar. 21, 2016, now Pat. No. 10,798,468, said application No. 15/484,891 is a continuation-in-part of application No. 13/295,393, filed on Nov. 14, 2011, now Pat. No. 9,652,459.

(60) Provisional application No. 62/136,269, filed on Mar. 20, 2015.

(51) Int. Cl.
| | | |
|---|---|---|
| *G06F 1/16* | (2006.01) | |
| *G06F 3/0482* | (2013.01) | |
| *G09G 5/12* | (2006.01) | |
| *H04L 29/08* | (2006.01) | |
| *H04N 21/414* | (2011.01) | |
| *H04N 21/4722* | (2011.01) | |
| *H04W 4/00* | (2018.01) | |
| *H04N 21/84* | (2011.01) | |

(58) Field of Classification Search
CPC ......... A63B 2071/0625; A63F 11/0051; A63F 2011/0058; G06F 16/48; H04L 67/10; H04L 67/12; H04N 21/84
See application file for complete search history.

(56) References Cited

U.S. PATENT DOCUMENTS

| | | |
|---|---|---|
| 7,526,578 B2 | 4/2009 | Bircher et al. |
| 3,066,572 A1 | 11/2011 | Timmons et al. |
| 9,124,856 B2 | 9/2015 | Deshpande et al. |
| 9,247,282 B1 | 1/2016 | Daniel |
| 9,454,993 B1 | 9/2016 | Lawson et al. |
| 2002/0138163 A1 | 9/2002 | MacPherson |
| 2003/0086123 A1 | 5/2003 | Torrens-Burton |
| 2003/0142238 A1 | 7/2003 | Wasack et al. |
| 2003/0144017 A1 | 7/2003 | Inselberg |
| 2004/0080485 A1 | 4/2004 | Altmaier et al. |
| 2005/0060741 A1 | 3/2005 | Tsutsui et al. |
| 2005/0240872 A1 | 10/2005 | Roeske |
| 2005/0272496 A1 | 12/2005 | Reinish et al. |
| 2006/0023117 A1 | 2/2006 | Feldmeier |
| 2006/0224964 A1 | 10/2006 | Schwartz et al. |
| 2007/0016861 A1 | 1/2007 | Salomaa et al. |
| 2007/0041706 A1 | 2/2007 | Gunatilake |
| 2007/0078898 A1 | 4/2007 | Hayashi et al. |
| 2007/0136133 A1 | 6/2007 | Li |
| 2007/0239779 A1 | 10/2007 | Hugill et al. |
| 2008/0005130 A1 | 1/2008 | Logan et al. |
| 2008/0062318 A1 | 3/2008 | Ellis et al. |
| 2008/0227500 A1 | 9/2008 | Heyworth et al. |
| 2009/0132583 A1 | 5/2009 | Carter et al. |
| 2009/0164569 A1 | 6/2009 | Garcia et al. |
| 2009/0192998 A1 | 7/2009 | Paulsen |
| 2009/0322652 A1 | 12/2009 | Adderton et al. |
| 2009/0327336 A1 | 12/2009 | King et al. |
| 2010/0005485 A1 | 1/2010 | Tian et al. |
| 2010/0103075 A1 | 4/2010 | Kalaboukis et al. |
| 2011/0013087 A1 | 1/2011 | House et al. |
| 2011/0018867 A1 | 1/2011 | Shibamiya et al. |
| 2011/0131520 A1 | 6/2011 | Al-Shaykh et al. |
| 2011/0157228 A1 | 6/2011 | Ptucha et al. |
| 2011/0238853 A1 | 9/2011 | Paul et al. |
| 2011/0246579 A1 | 10/2011 | Williams |
| 2011/0280540 A1 | 11/2011 | Woodman |
| 2012/0017150 A1 | 1/2012 | Pollack |
| 2012/0023099 A1 | 1/2012 | Crossley et al. |
| 2012/0072845 A1 | 3/2012 | John et al. |
| 2012/0189273 A1 | 7/2012 | Folgner et al. |
| 2012/0210348 A1 | 8/2012 | Verna et al. |
| 2013/0007043 A1 | 1/2013 | Phillips et al. |
| 2013/0054716 A1 | 2/2013 | Levinson et al. |
| 2013/0070047 A1 | 3/2013 | DiGiovanni et al. |
| 2013/0077043 A1 | 3/2013 | Moran |
| 2013/0120123 A1 | 5/2013 | Aman et al. |
| 2013/0124461 A1* | 5/2013 | Dombrowski .......... G06F 16/48 707/610 |
| 2013/0150988 A1 | 6/2013 | Kuck et al. |
| 2013/0275868 A1 | 10/2013 | Haussila et al. |
| 2013/0278826 A1 | 10/2013 | Schlieski et al. |
| 2013/0298053 A1 | 11/2013 | Sprang et al. |
| 2014/0064693 A1 | 3/2014 | Deshpande et al. |
| 2014/0139531 A1 | 5/2014 | Tillman et al. |
| 2014/0143687 A1 | 5/2014 | Tan et al. |
| 2014/0259708 A1 | 9/2014 | Foster |
| 2014/0288683 A1 | 9/2014 | Sullivan |
| 2014/0321831 A1 | 10/2014 | Olsen et al. |
| 2015/0052546 A1 | 2/2015 | Ortiz et al. |
| 2015/0193172 A1 | 7/2015 | Hokari et al. |
| 2015/0217179 A1 | 8/2015 | Olsson et al. |
| 2016/0045810 A1 | 2/2016 | Minkovitch |
| 2016/0213995 A1 | 7/2016 | Huebsch |
| 2019/0045258 A1* | 2/2019 | Egedi ................ H04N 21/8133 |

OTHER PUBLICATIONS

PCT International Preliminary Report on Patentability dated Oct. 15, 2019 for PCT/US2018/026647.
PCT International Search Report and Written Opinion dated Jun. 26, 2018 for PCT/US2018/026647.
PCT International Search Report dated Jun. 9, 2016 for PCT/US2016/023453.

* cited by examiner

METHOD AND SYSTEM FOR PRESENTING GAME-RELATED INFORMATION

CROSS REFERENCE TO RELATED APPLICATIONS

The present application claims the benefit under 35 U.S.C. § 120 of U.S. patent application Ser. No. 15/076,133 filed Mar. 21, 2016. The U.S. patent application Ser. No. 15/076,133 filed Mar. 21, 2016 claims the benefit under 35 U.S.C. § 119(e) of U.S. Provisional Application Ser. No. 62/136,269 filed Mar. 20, 2015.

The present application claims the benefit under 35 U.S.C. § 120 of U.S. patent application Ser. No. 15/484,891 filed Apr. 11, 2017. The U.S. patent application Ser. No. 15/484,891 filed Apr. 11, 2017 claims the benefit under 35 U.S.C. § 120 of U.S. patent application Ser. No. 13/295,393 filed Nov. 14, 2011, now U.S. Pat. No. 9,652,459.

The U.S. patent application Ser. No. 15/076,133 filed Mar. 21, 2016, U.S. Provisional Application Ser. No. 62/136,269 filed Mar. 20, 2015, U.S. patent application Ser. No. 15/484,891 filed Apr. 11, 2017, and the U.S. patent application Ser. No. 13/295,393 filed Nov. 14, 2011 are hereby incorporated by reference in their entirety.

TECHNICAL FIELD

The present disclosure generally relates to the field of content delivery, and more particularly to a method and system for presenting game-related information.

BACKGROUND

Conventional scoreboards commonly found in a high school gymnasium or youth sports venue typically include an electronic scorekeeping device with a key pad on a scorer's table and a wired or wireless connection to a fixed display scoreboard that hangs on the wall of a gym or arena and interprets the signals from the score keeper's device to display the game clock, score, and other pertinent game information. Conventional scoreboards are limited in the type of information that can be presented and the limited ability to view the conventional scoreboards. For example, a conventional scoreboard may only present information related to a score of the game, the section of the game, and the time remaining in the game.

SUMMARY

Accordingly, the present application is directed to a method and system for presenting game-related information. A system for presenting game-related information may include an initiator device, the initiator device including a computing device which includes an application executed by a processor of the computing device to generate game-related information, a display device operably connected to the initiator device to display game-related information from the initiator device, and a cloud-based server device operably connected to the initiator device for receipt of the game-related information. In an embodiment of the disclosure, the system for presenting game related information may include a receiver device, the receiver device including a computing device which includes an application executed by a processor of the computing device to receive the game-related information from the cloud-based server device.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Before any embodiments of the disclosure are explained in detail, it is to be understood that the embodiments may not be limited in application per the details of the structure or the function as set forth in the following descriptions or illustrated in the figures. Different embodiments may be capable of being practiced or carried out in various ways. Also, it is to be understood that the phraseology and terminology used herein is for the purpose of description and should not be regarded as limiting. The use of terms such as "including," "comprising," or "having" and variations thereof herein are generally meant to encompass the item listed thereafter and equivalents thereof as well as additional items. Further, unless otherwise noted, technical terms may be used according to conventional usage. It is further contemplated that like reference numbers may describe similar components and the equivalents thereof.

Method and System for Presenting Game-Related Information

Figure 1:
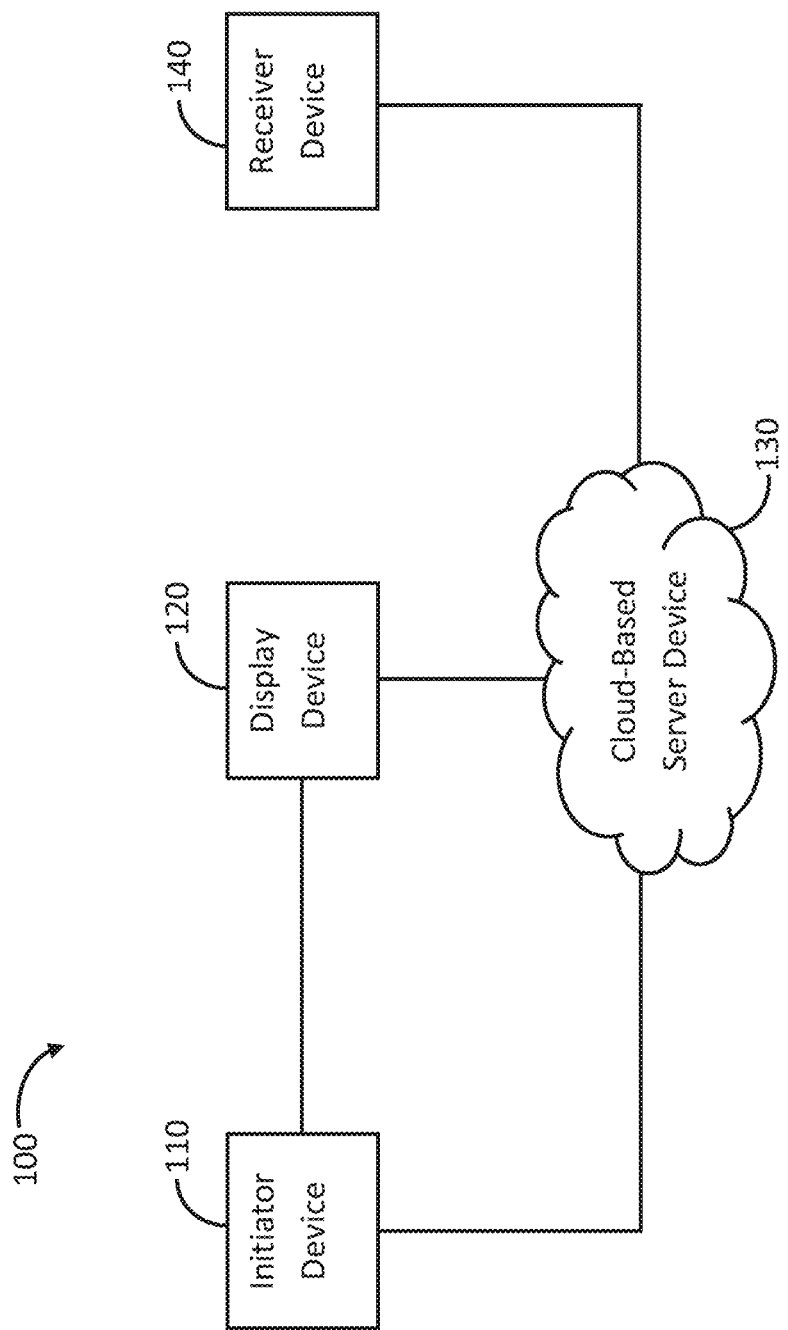
FIG. 1 depicts a block diagram of a system for presenting game-related information in accordance with an embodiment of the present disclosure.

Referring to FIG. 1, a block diagram of a system 100 for presenting game-related information in accordance with an embodiment of the present disclosure is shown. System 100 for presenting game-related information may include an initiator device 110. Initiator device 110 may include a computing device (e.g. a computer, laptop, tablet, smartphone and the like) which includes an application (e.g. an app) executed by a processor of the computing device to generate game-related information. It is contemplated that application may refer to one or more instructions, e.g. software, which may be executed by a processor or processing unit. It is contemplated that initiator device 110 may include a graphical user interface with pre-defined data entry input fields to facilitate data entry of game-related information by a user. System 100 may further include a display device 120 operably connected to the initiator device to display game-related information from the initiator device 110. Display device 120 may include a monitor, television, a plurality of televisions combined to form a single display, a LED display, a projector, and the like. It is contemplated that display device 120 may include a processor configured to execute one or more instructions, (e.g. an application) to receive game-related information and present the game-related information. Initiator device 110 may be operably connected with display device 120 via a network. Network may include a hard-wired connection or a wireless connection, such as WIFI or BLUETOOTH.

Figure 2:
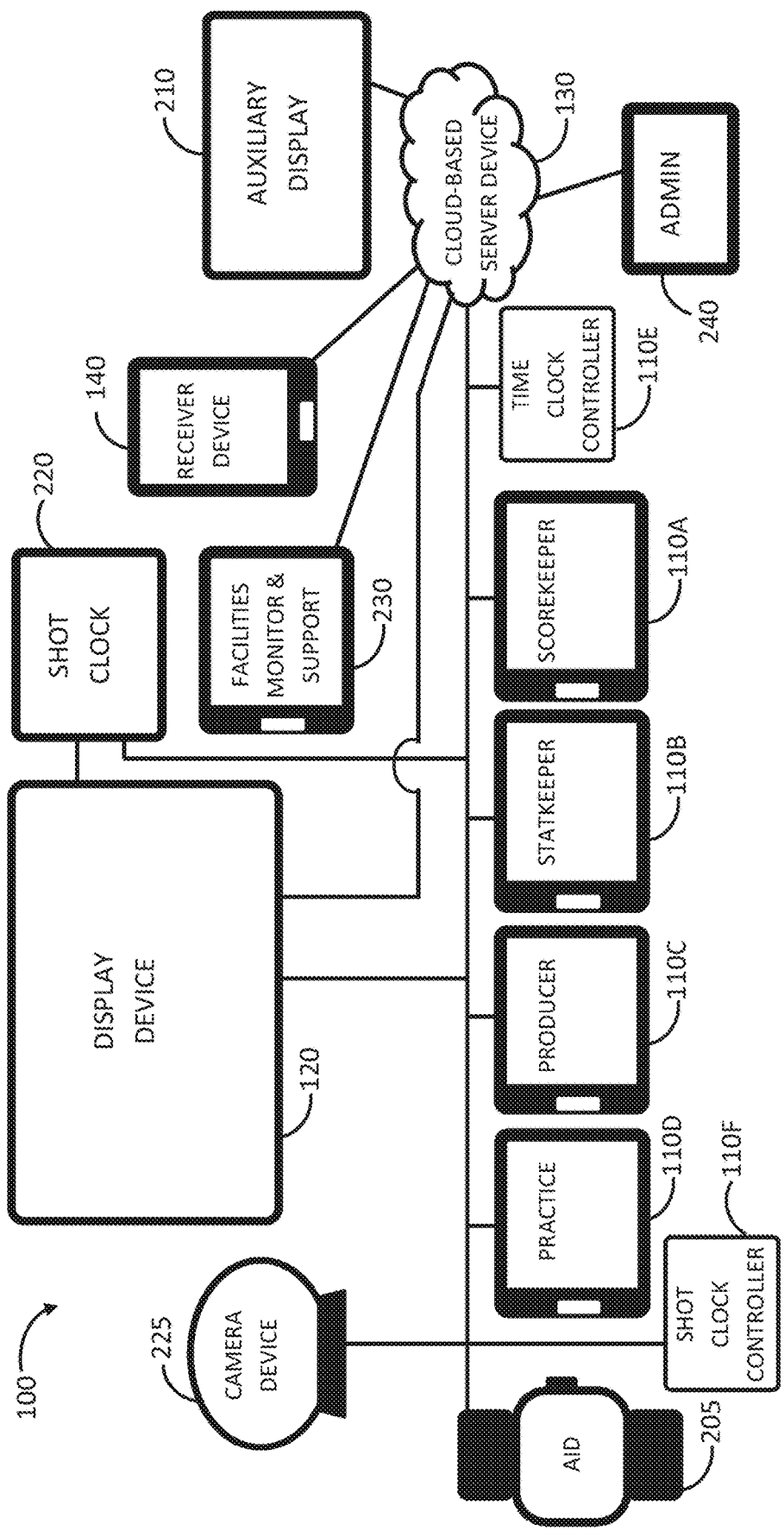
FIG. 2 depicts another block diagram of a system for presenting game related information in accordance with an embodiment of the present disclosure.

Display device 120, and auxiliary display 210 as shown in FIG. 2, may be configured to execute a list of instructions, such as a display application, to allow adoption of a variety of aspect ratios including 4:3, 3:2, 2:1 and 16:9. Display application may be a MacOS application in accordance with an embodiment of the present disclosure. Display device 120 and auxiliary display 210 may be a multimedia board display, such as in a form of LEDs or commercial-grade, high-definition monitors. The display application operating on display device 120 and auxiliary display 210 may be configured to track and record impressions of ads displayed in rotating sequences. Additionally, display application operating on display device 120 and auxiliary display 210 may be configured to perform a periodic check with the cloud-based server device 130 and may be configured to download new information (game, team, player, ad sequences, and the like) as it may become available. The display application may be configured to present a branding design that may wrap a game board (and alternative use content) and may be customized in one or more ways for each organization controlled through the initiator device 110C, known as the producer, and to be discussed further.

System 100 may include a cloud-based server device 130 which may be operably connected with initiator device 110 to receive game-related information. In an embodiment of the disclosure, system 100 may further include a receiver device 140. Cloud-based server device 130 may include a computing device (e.g. a computer, laptop, tablet, smartphone and the like) which includes a list of instructions (e.g. an application executed by a processor of the computing device to store game-related information. Cloud-based server device 130 may receive game-related information from initiator device 110 and from receiver device 140, facilities monitor and support 230, and admin device 240 as shown in FIG. 2 Receiver device 140 may be operably connected to the cloud-based server device 130. Receiver device 140 may include a computing device (e.g. a computer, laptop, tablet, smartphone and the like) which includes a list of instructions (e.g. an application) executed by a processor of the computing device to retrieve game-related information from the cloud-based server device 130. It is contemplated that receiver device 140 may include a graphical user interface with pre-defined data entry input fields to facilitate receipt of game-related information by a user and an interface for data input from a user to facilitate receipt of a type, or subset of game-related information. In one embodiment, receiver device 140 may include a mobile computing device, such as a laptop, tablet or smartphone which may include an integrated wireless transceiver to wirelessly connect to cloud-based server device 130.

Cloud-based server device 130 may be operably connected to the initiator device 110 for receipt of the game-related information, and retrieval of game-related information by receiver device 140. Initiator device 110 and receiver device 140 may connect to a cloud-based network (e.g. the internet) via a hard-wired connection or wireless connection. It is contemplated that computing device of the initiator device 110 may include a mobile computing device, such as a laptop, tablet, smartphone which includes an integrated wireless transceiver. Once a connection has been established and verified with the cloud-based server device 130, the application of the computing device of the initiator device 110 may upload and synchronize game-related information to a cloud-based database residing on a cloud-based server device 130 (e.g. a web server accessible over a web-browser or application implemented on the computing device of the initiator device 110). Cloud-based server device 130 may implement at least one cloud-based application executable by a processor of the computing device of cloud-based server device 130 to allow access by initiator device 110 or receiver device 140.

It is contemplated that display device 120 may be operably connected to cloud-based server device 130. Display device 120 may retrieve game information, player information and additional content including advertisements from cloud-based server device 130. It is further contemplated that this information may be pre-loaded from the cloud-based server device 130 to display device 120 to allow more efficient execution of display elements, particularly for large-sized video segments. Advantageously, with files being transferred from the cloud-based server device 130 to the display device, delays and interruptions which may occur during video streaming may be avoided. Also, it may be possible to execute software and application updates that may be provided from the cloud-based server device to the initiator device 110, display device 120 and receiver device 140.

In an example embodiment, through the web-browser software, a user can use the computing device of initiator device 110, display device 120 or receiver device 140 to log on to cloud-based services (e.g., by the web-browser software resident on the computing device communicating with cloud-based server device 130) to access a cloud-based database. After logging-on to the cloud-based server device, game-related information sent to display device 120 by initiator device 110 may be simultaneously delivered to cloud-based server device 130. Advantageously, after logging-on to the cloud-based server device 130, game-related information stored at a database of the cloud-based server device 130 may be retrieved by receiver device 140. In such a fashion, a user of receiver device may access the current game information via the receiver device, such as a smartphone, in order to better follow action of a game without necessarily being in view of the scoreboard, or display device 120.

As shown in FIG. 1, system 100 includes a single initiator device 110, a single display device 120 and a single receiver device 140. It is contemplated that this figure is presented for exemplary purposes. However, it is contemplated that system 100 may include a plurality of initiator devices 110 (e.g. separate initiator devices may be employed for time information, score information, and statistical information). System 100 may include a plurality of display devices 120 and may include a plurality of receiver devices 140 (e.g. each fan may utilize a smartphone to retrieve game-related information presented to them on their smartphone).

Referring to FIG. 2, another block diagram of a system 100 for presenting game related information in accordance with embodiment of the present disclosure is shown. Similar to system 100 as depicted in FIG. 1, system 100 as shown in FIG. 2 may include initiator devices 110A-110F, a display device 120, cloud-based server device 130 and receiver device 140. It is contemplated that initiator device 110 of system 100; however may be implemented in a variety of computing devices for presenting game-related information input by one or more users which may be delivered to display device 120 via a hard-wired or wireless connection and simultaneously sent to cloud-based server device 130. As shown, system 100 may include a variety of initiator devices 110A-110F, each including an application to serve a particular function or set of functions, in order to facilitate accurate and reliable data entry associated with a game by one or more users. However, it is contemplated that the applications associated with initiator devices 110A-110F may be integrated into a single, two, three and the like computing devices without departing from the scope and intent of the present disclosure.

Initiator device 110A may be referred as a scorekeeper. Initiator device 110A may include a graphical user interface configured for time and score information related to a game. It is contemplated that the scorekeeper may be implemented as an application for use within a computing device, such as a laptop, tablet or smartphone. It is contemplated that the scorekeeper may be employed to manage game-related information such as time, score, fouls, and point/foul-to-player attribution during a game. It is contemplated that the graphical user interface of scorekeeper may be customized to serve a particular type of game, such as basketball, volleyball, wrestling, football, swimming, soccer, baseball, hockey and the like. By adjusting the interface to the type of game, data input by a user viewing the particular type of game may be improved.

Figure 3A:
FIG. 3A-3C depict exemplary graphical user interfaces of the scorekeeper in accordance with an embodiment of the present disclosure.
Figure 3B:
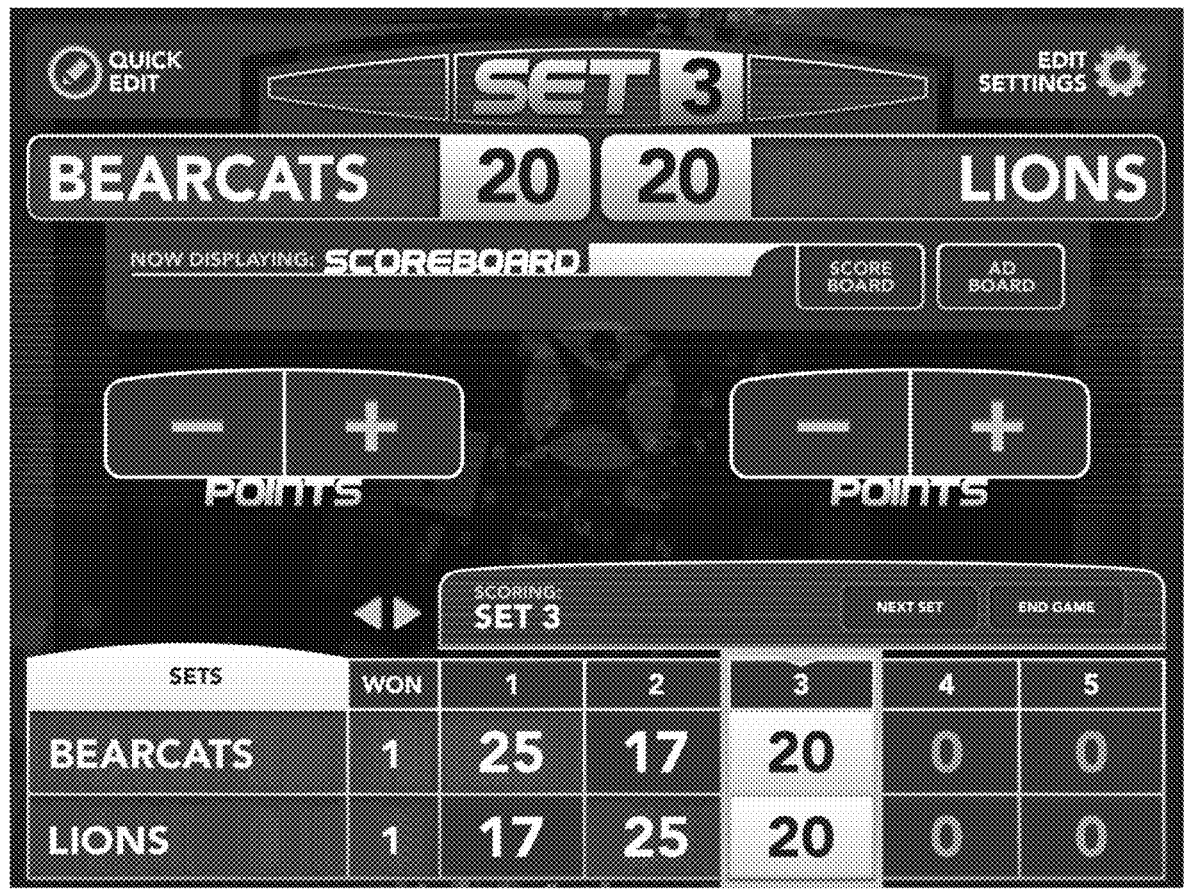
Figure 3C:
Figure 4A:
FIG. 4A-4B depict QUIX elements which may be quickly introduced via a button as shown in FIG. 3A and may include images, videos, motion graphics and interactive content that may overlay or interrupt elements on the display of display device in accordance with an embodiment of the present disclosure.
Figure 4B:
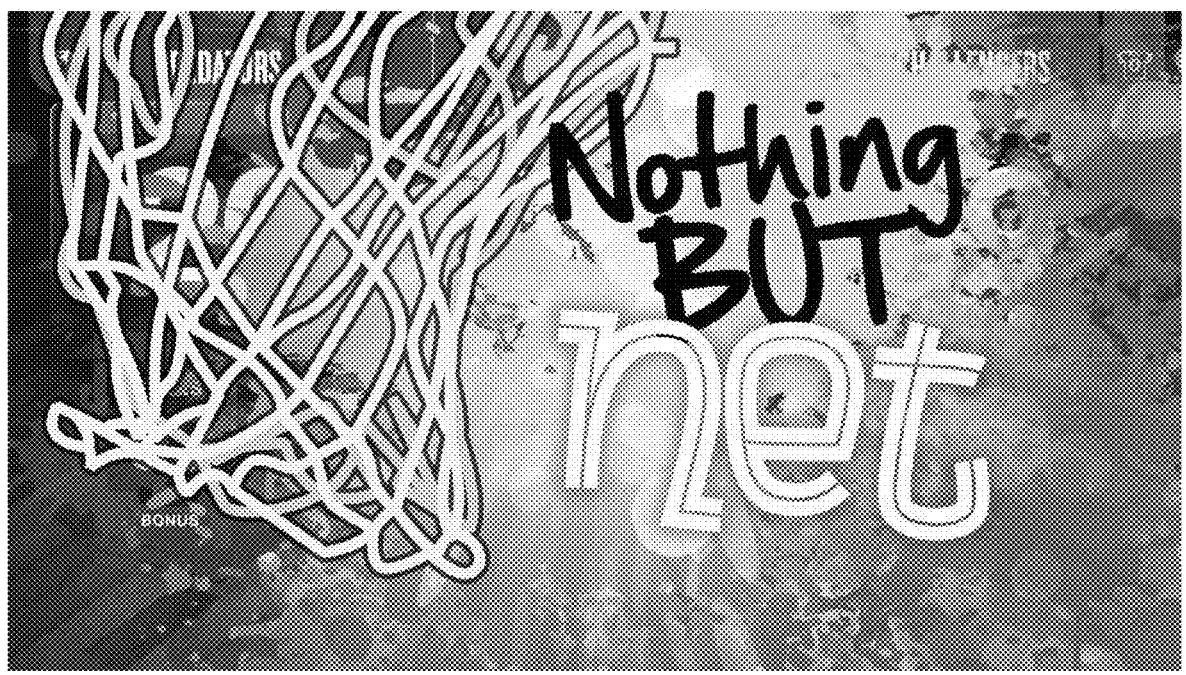
Figure 5:
FIG. 5 depicts an exemplary screenshot which may be automatically presented to a user of the scorekeeper to allow transitioning to halftime in accordance with an embodiment of the present disclosure.
Figure 6A:
FIG. 6A-6B depict exemplary screenshots of the Scoreboard Assistant in accordance with an embodiment of the present disclosure.
Figure 6B:
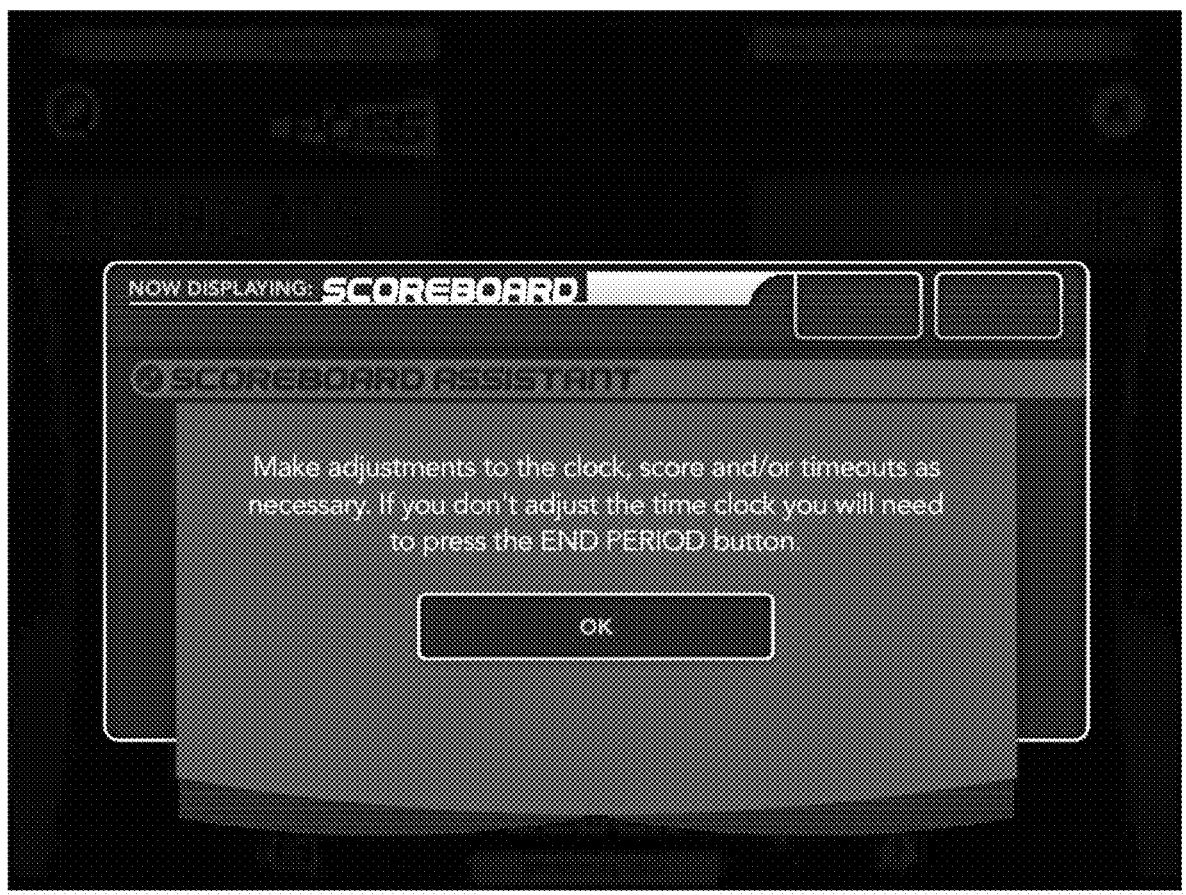

Referring to FIG. 3A-3C, exemplary graphical user interfaces of the scorekeeper in accordance with embodiments of the present disclosure are shown. It is contemplated that the graphical user interface of the scorekeeper may include limited controls for displaying particular elements, pre-loaded pieces of content that may be activated for display via a button on the graphical user interface, referred as "QUIX" elements as shown in FIG. 3A. These QUIX elements may include images, videos, motion graphics and interactive content that may overlay or interrupt elements on the display of display device 120 as shown in an exemplary embodiment in FIG. 4A-4B. Additionally, the scorekeeper may include smart logic that may provide cues, alerts and/or alarms for the user to assist them through standard processes and transitions, referred as the Scoreboard Assistant. For example, when the clock runs down to halftime of a game, the scorekeeper application of initiator device 110A may recognize the end of the half and may automatically present a user with appropriate options to allow transitioning to halftime, such as the screenshot as shown in exemplary fashion in FIG. 5. Referring to FIG. 6A-6B, examples of the Scoreboard Assistant are shown in accordance with an embodiment of the present disclosure. Additionally, it is contemplated that not every game follows the exact same rules (e.g. there are various overtime rules); therefore the scorekeeper application may retrieve various settings from the cloud-based server device 130 for default settings. However, a user may be allowed to override those default settings at any individual game whereby the smart logic of the scorekeeper application may react appropriately for each game instance.

Figure 7A:
FIG. 7A-7B depict exemplary graphical user interfaces of the scorekeeper for generating a desired layout of the screen of the display device in accordance with an embodiment of the present disclosure.
Figure 7B:
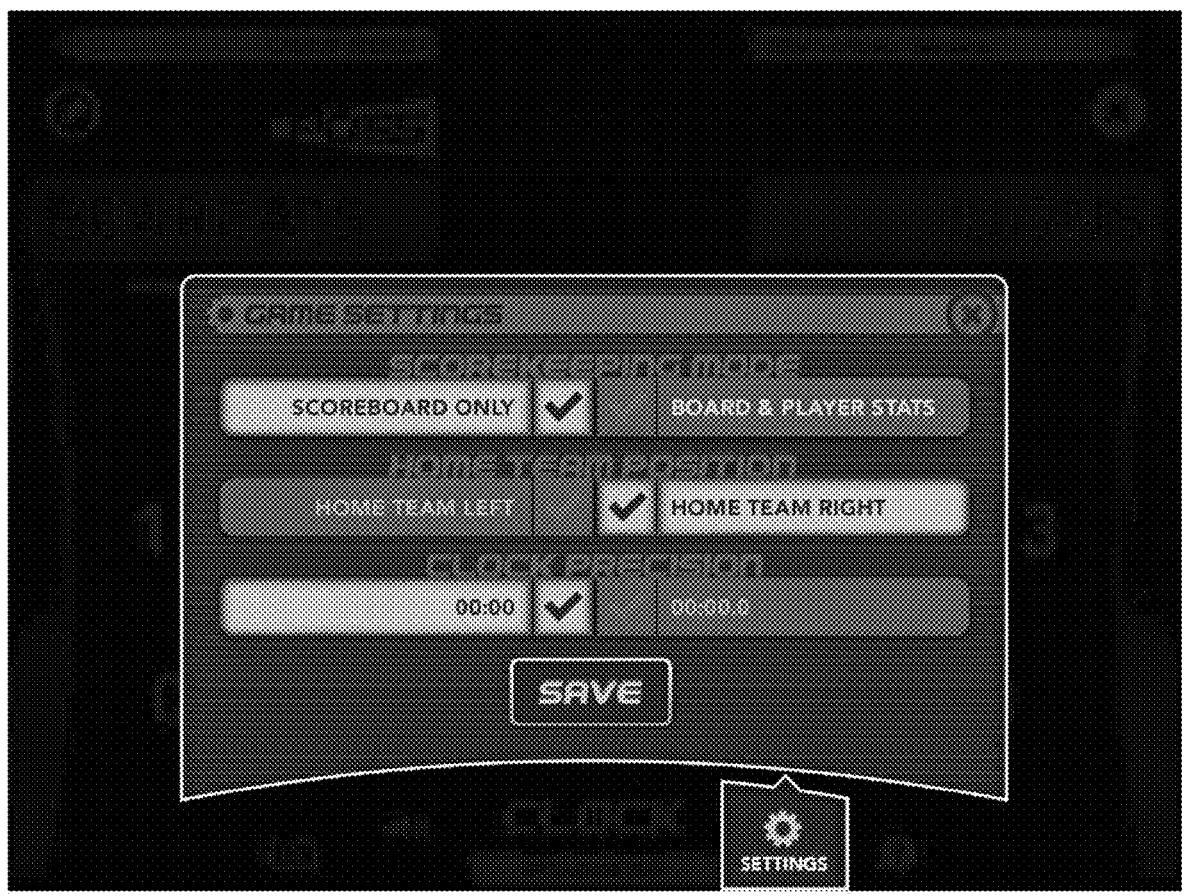

Referring to FIG. 7A-7B, exemplary graphical user interfaces of the scorekeeper for generating a desired layout of the screen of the display device 120 in accordance with an embodiment of the present disclosure are shown. Advantageously, the scorekeeper may include graphical user interfaces to change the color, form and layout of the display device 120 in a quick and easy manner. This may be particularly advantageous when more than one team may utilize a particular facility. By employing the pre-installed versions of the graphical user interfaces as shown in FIG. 7A-7B, a display device 120 may be quickly adapted to display game-related information for different teams. It is further contemplated that any additional content that may be employed may also be easily customized to ensure that different graphics, videos and advertisements may be employed.

Initiator device 110B may be referred as a statkeeper. Initiator device 110B may include a graphical user interface configured for entry of individual player statistics. It is contemplated that the statkeeper may be implemented as an application for use within a computing device, such as a laptop, tablet or smartphone. It is contemplated that the statkeeper may be employed to manage game-related information such as advanced games statistics (e.g. for basketball, the statkeeper may be utilized in place of the long-standing paper stat sheet and may manage the same bits of information including player number, 3 point field goal attempts, 3 point field goal makes, 2 point field goal attempts, 2 point field goal makes, field goal percentage, free throw attempts, free throw makes, free throw percentage, assists, turnovers, offensive rebounds, defensive rebounds, steals, deflections, blocked shots, no help, got beat, fouls, fastbreak points, and totals per quarter and period, and the like). Similar to initiator Device 110A referred as scorekeeper, initiator device 110B referred as statkeeper may simultaneously push data to cloud-based server device 130 for storage of player statistics. Also, it is contemplated that the graphical user interface of statkeeper may be customized to serve a particular game, such as basketball, volleyball, wrestling, football, swimming, soccer, baseball, hockey and the like for easier data input by a user.

Referring once again to FIG. 2, initiator Device 110C may be referred as a producer. Initiator device 110C may include a graphical user interface configured for retrieval and selection of additional content for display on display device 120. It is contemplated that the producer may be implemented as an application for use within a computing device, such as a laptop, tablet or smartphone. It is contemplated that the producer may be configured to control and manage additional content for display on display device 120 and may monitor and manage a status (including power on/off) of the connections and components.

Figure 8:
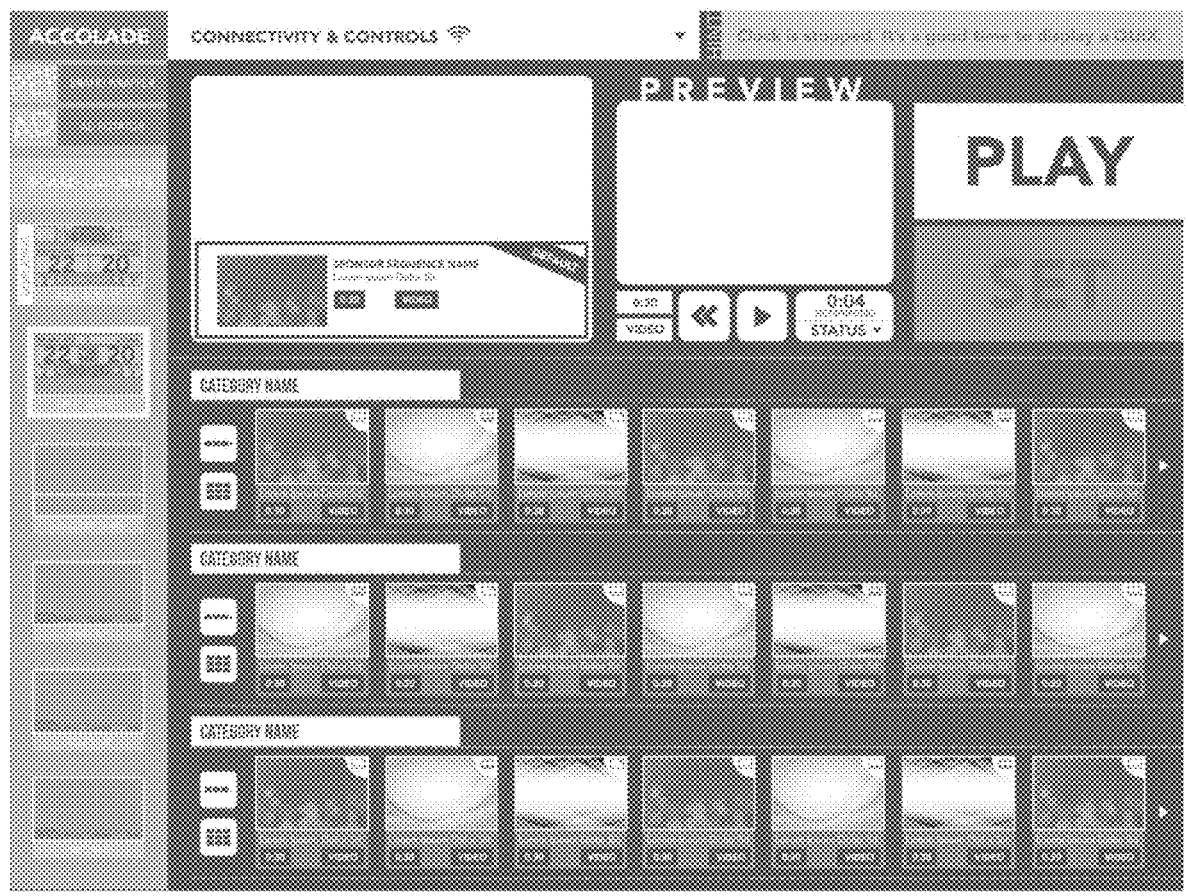
FIG. 8 depicts a graphical user interface which includes various content offerings, stored on the cloud-based server device, for access and selection via the producer in accordance with an embodiment of the present disclosure.

Producer may be operably connected with the cloud-based server device 130 for retrieval of content. Referring to FIG. 8, a screenshot of a graphical user interface which includes various content offerings, stored on the cloud-based server device 130, for access and selection via the producer is shown. The additional content may include the pre-defined "QUIX" elements like a National Anthem, Player Accolades, a variety of Hype Animations (e.g. "Make Some Noise" and "3 Pointer" banners as shown in an exemplary embodiment in FIG. 4A-4B and may be activated by an interface. (e.g. a single button) on scorekeeper as shown in FIG. 3A. The additional content may include "Ad Sequences" which may be displayed at the display device 120 and may be employed to generate additional revenue for schools and youth organizations. It is further contemplated that the additional content available for usage during a game may be retrieved from the cloud-based server device 130. In addition to content, authorized layouts may be available for manipulation on the cloud-based server device 130. Producer may also be able to access photos and comments provided by others via social media and can be retrieved and deployed to the display device 120 and auxiliary display 210.

Figure 9:
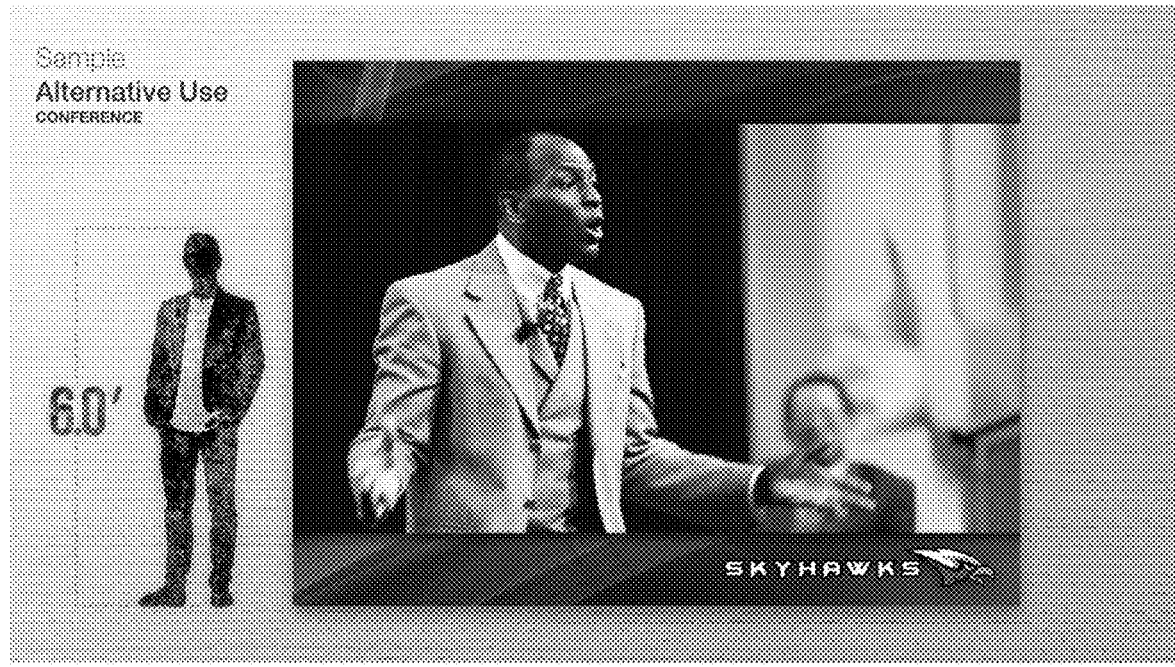
FIG. 9 depicts a screenshot with advertisement of display device suitable to present photos and video of an event in accordance with an embodiment of the present disclosure.

Producer may be configured to present the additional content for all available views (e.g. countdown screens, various scoreboard layouts, and ad rotators) and may be configured to push layouts and content to a live display with a simple push of a "play" button on the graphical user interface. Additionally, producer may include a universal remote feature which is configured to allow communication with each of the hardware components via APIs in order to enable a user to monitor and manage the status of the system components. It is contemplated that producer may include input controls that enable the user to change input source on the display device 120 which allows for connection of other devices to the display device 120 for alternative uses (e.g. presentations, live videos and the like, such as for a graduation ceremony as shown in FIG. 9.) It is contemplated that the connection and content will flow through the producer that sponsor, brand and/or ad elements can be laid over top the content being displayed.

Referring once again to FIG. 2, initiator device 110D may be referred as practice, initiator device 110E may be referred as time clock controller, and initiator device 110F may be referred as the shot clock controller. Initiator device 110D, initiator device 110E and in initiator device 110F may include a graphical user interface configured for data input for practice information, time clock information and shot clock information respectively. It is contemplated that the practice, time clock controller and shot clock controller may be implemented as one or more applications for use within a computing device, such as a laptop, tablet or smartphone. It is contemplated that the initiator device 110D referred as practice may be configured to augment practice drills and physical education activities by providing an optimized interface and experience that supports scoring and time-tracking needs of these drills and activities. Initiator device 110E referred as time clock controller may be configured to control the time clock, such as through a tactile, switch-style hardware device. Initiator device 110F referred as shot clock controller may be configured as a switch-style, hardware device which may be operably connected to the display device 120 and/or the shot clock 220 and may include a switch to start and stop the shot clock 220. It is contemplated that the shot clock 220 may be operably connected with the display device 120 or may be connected to the secure network and receive separate input from shot clock controller 110F.

System 100 may include a camera device 225, or plurality of camera devices. Camera device 225 may refer to a digital camera configured for still or motion video. Camera device 225 may be operably connected to the network and/or may be installed and wired to a dedicated video server which may be networked to a display application of the display device 120. Camera device 225 may be configured to take pictures or photos of the display device 120 when ads or advertisements appear. Each photo taken by the camera device 225 may be triggered by a changing ad or advertisement. It is contemplated that a list of instructions, such as an application, executed by the camera device 225, may tag a photo and transfers it to the cloud-based server device 130. This may allow tracking of ads and advertisements in order to generate performance reports for validation that the ad or advertisement was actually displayed as promised. It is contemplated that camera device 225 may also obtain photos and/or video footage of the action on the court or field. For example, it is contemplated that camera device 225 may be directed to individuals in the stands. From photos taken of individuals in the stands, it is contemplated that a number of individuals present in the stands, and thus available to view the advertisements of the display device 120, may be stored and presented to advertisers. Additionally, it is contemplated that camera device 225 may employ computer vision to track an aspect of the game, such as a ball, and follow the action in order to deliver automated, streaming content of the game which could be sent to the cloud-based server device and viewed by a user on receiver device 140, in near real-time.

System 100 may include an aid device 205. Aid device 205 may include a computing device (e.g. a computer, laptop, tablet, smartphone and the like) which includes an application (e.g. an app) executed by a processor of the computing device to receive game-related information from initiator device 110A-110F. It is contemplated that aid device 205 may be a wearable device, such as APPLE MATCH. It is further contemplated that aid device 205 may provide an alert or alarm for a referee, game coordinator, or coach. For example, aid device 205 may be configured to provide an alert or alarm to a referee, game coordinator or coach regarding foul-outs, timeouts, end of section, game start time and the like. Game-related information provided to aid device 205 may further include countdown clocks for game start and half-time resumption of game as well as an updated list of players and foul counts.

System 100 may include a receiver device 140. Receiver device 140 may include a computing device, such as a laptop, tablet, or smartphone. Once a connection has been established and verified with the cloud-based server device 130, an application of the computing device of the receiver device 140 may retrieve game-related information from initiator devices 110A-110F via a cloud-based database residing on a cloud-based server device 130. Cloud-based server device 130 may implement at least one cloud-based application executable by a processor of the cloud-based server device 130 to allow access by a computing device of receiver device 140.

Figure 10:
FIG. 10 depicts a graphical user interface on a display of a receiver device in accordance with an embodiment of the present disclosure.
Figure 11A:
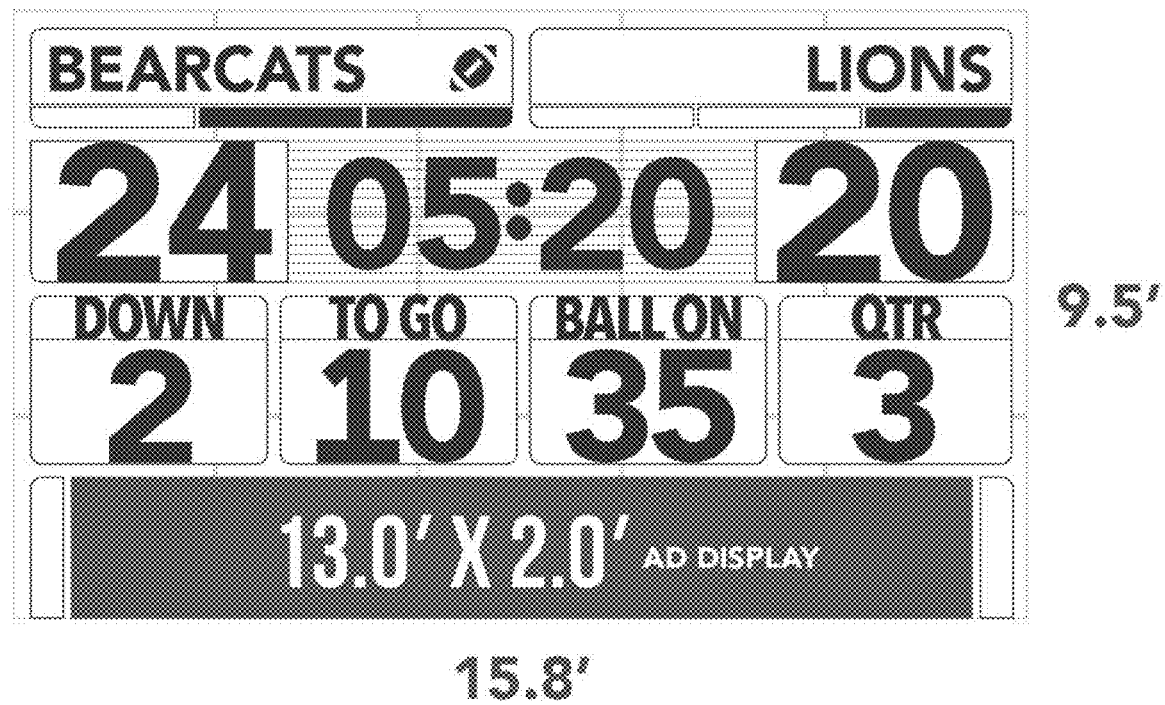
FIG. 11A-11D depict layouts and view options that may be available for display device in accordance with an embodiment of the present disclosure.
Figure 11B:
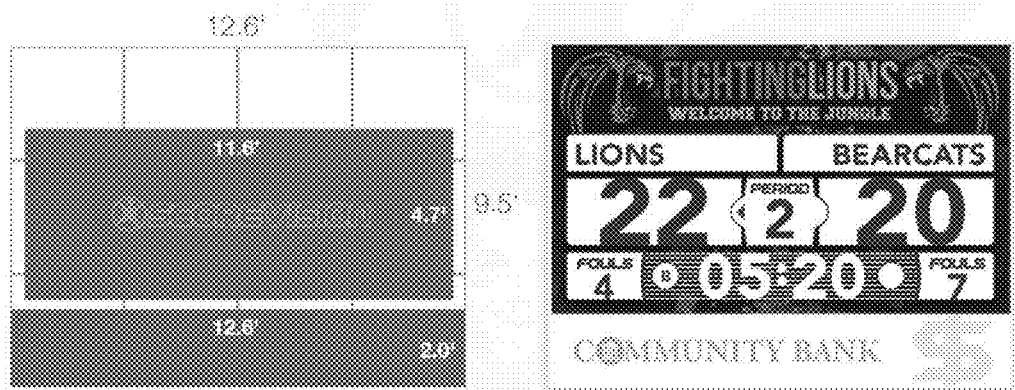
Figure 11C:
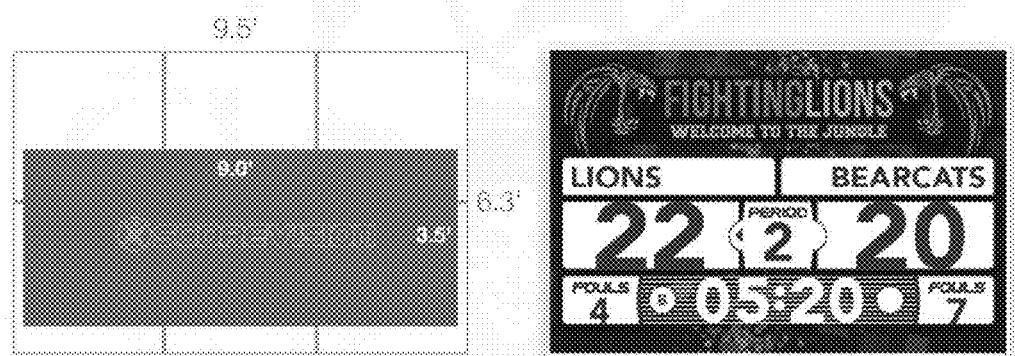
Figure 11D:
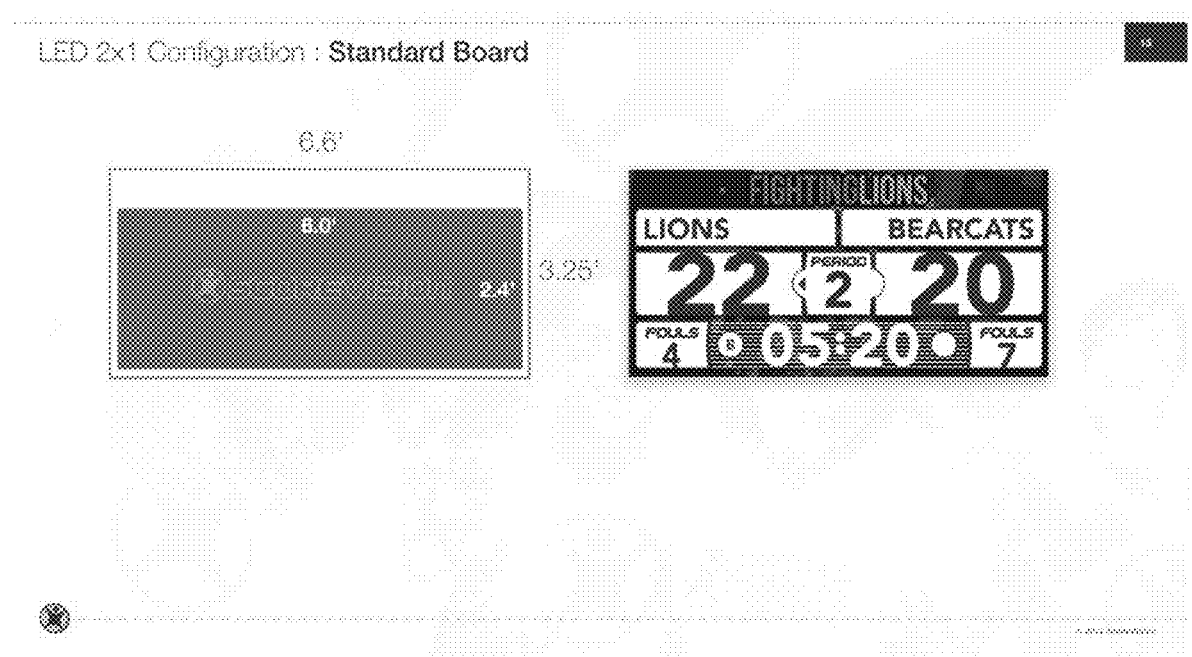

Receiver device 140 may be referred as a fan device which may be implemented to receive game-related information to be viewed via a graphical user interface on a display of a receiver device 140 as shown in an exemplary fashion in FIG. 10. The game-related information may include photos and video from camera device 225 and may include scores, fouls, game breaks, ad sequences in persistent and interstitial deliveries, advanced player stats, team schedules as it is available and provided via the initiator devices 110A-110F and cloud-based server device 130.

Additionally, receiver device 140 may include one or more instructions in an application in which input information may be received from a user and transmitted to the cloud-based server device 130. This input information may include a request for a type of subset of the game-related information, such as a particular feed from a camera device 225 or particular statistics from a particular player. For example, this type or subset of the game-related information may include a request for advanced stats for teams, particular players, particular number, as well as team schedules. It is contemplated that cloud-based server device 130 may be configured to filter the game-related information in order to present the type or subset of information included in the request from the user via the receiver device 140. Additionally, this input information may include answers to trivia challenges and contributory games. It is contemplated that display device 120 may include a spirit meter in which fans for two teams may compete in a spirit tug-of-war. It presents an animated slider graphic on the display device 120 and may utilize social media integration and special logic to weigh crowd participation on social media, (e.g. measuring presence of pre-identified tweets on TWITTER shared by each team during a specific timeframe). It is further contemplated that users, via the receiver device 140, will be able to take photos or videos provided by an integrated camera of a mobile computing device and then tag and share them with others using the application of the receiver device. These shared images or videos may be stored at the cloud-based server device 130 with tagging and associated to an appropriate team, game and player.

System 100 may further include facilities and management support device 230 and an admin device 240. Facilities and management support device 230 and admin device 240 may include a computing device (e.g. a computer, laptop, tablet, smartphone and the like) which includes one or more instructions (e.g. an application) executed by a processor of the computing device. Facilities and management support device 230 and admin device 240 may connect to a cloud-based network (e.g. the internet) via a hard-wired connection or wireless connection. Once a connection has been established and verified with the cloud-based server device 130, facilities and management support device 230 and admin device 240 may allow configuration of cloud-based server device 130. Facilities and management support device 230 may provide an oversight tool for a facilities manager to monitor activity on multiple courts in a building at the same time. It is contemplated that a preview of content displaying on each device in a facility may be presented via the facilities and management support device 230 with status indicators. Facilities and management support device 230 may include help notifications which may be triggered and supplied to the facilities and management support device 230 by each active scorekeeper connected to hard-wired or wireless network. Also, facilities and management support device 230 may be configured to monitor basic hardware controls (power on/off/reset) in order to provide remote resets.

Admin device 240 may include a variety of applications to facilitate management of system 100, the retrieval and delivery of statistical information, additional content, and advertisements. Management may include the game information before and after the game. For example, through the admin device 240, a user may create and manage season, team, game and player data, including team schedules so that it may be available for download to the initiator devices 110A-110F at game time or receiver device 140. Also, admin device 240 may include an import feature which enables a user to upload a spreadsheet of data from third party tournament systems like Tourney Machine for quicker set up of large game events and to eliminate unnecessary keystroking to enter data. After a game is completed, admin device 240 may review and reconcile game event data. Admin device 240 may allow a user to define layouts and view options that may be available to the initiator device 110C, the producer. These exemplary layouts and view options are shown in FIG. 11A-11D.

Admin device 240 may include a profile and statistical reporting application. Authorized users, such as (administrators, coaches, players, parents, recruiters, and the like) may review and download reports on season, team, game and player data recorded via the initiator devices 110A-110F, for example scorekeeper and statkeeper. It is contemplated that this profile and statistical reporting application may aggregate information in the system that is input through the admin device 240, recorded via the initiator devices 110A-110F and contributed through the receiver device 140 (e.g. tagged photos and videos). The aggregated player information may be compiled as reports in a manner that family members could download them as "memory books" or share with recruiters as a sports portfolio.

Admin device 240 may include a creative center application. The creative center application may include a toolset to enable administrators and content contributors to upload and manage collections of content, for later display on display device 120 during games and events. Users may leverage the tools in this toolset to organize and collect content and assign it to specific games via initiator device 110C known as the producer so that the selected content may be ready for display during game time. Users may use these tools to define "default" content for each of the layouts and areas that may be available for view. The content may be stored in a private, organization-level "library" with options to share pieces of content with other users. Additionally, shared content may not have a cost to the contributor who wants to share it but there may be an option for the contributor to offer the content for free or at a cost—users can add "shared" content to their own library but may be charged the cost of the content if fees are assigned to the contributor (the fee may be provided to a contributing organization).

Admin device 240 may include a sponsor and ad management application. Sponsor and ad management may enable a user to create libraries of advertisements and ads that may be deployed to the display device 120 or auxiliary display 210, along with receiver device 140. Sponsor and ad management application may include different levels of management controls available, which may include a super admin level control that may have reign over all organizations, subsets of data and permission/relationship controls, a partner level control that may have reign over data for a specific organization (or organizations) to which they are assigned and an organization level control that may enable a user to manage only data within their associated organization.

Sponsor and ad management application may include a toolset to enable authorized users to upload and organize ad content (images or videos) by sponsor. The user may assign a particular ad to a particular location on the display, time, and the like or may include sequences to specific rotation areas on the display device 120 or auxiliary display 210. It is contemplated that sequences may be defined at the organization level which will automatically trickle down to all seasons and games as they are created. The toolset of the sponsor and ad management application may enable a user to override the trickle down assignment with other sequences at the season and then even down to the game level. It is contemplated that sponsor and ad management application may include a tool which may enable a forced push of ads to the display device 120 with a visual preview of the ad sequence rotation. Also, a reporting feature, as employed with the camera device 225, may be part of the sponsor and ad management application. The reporting feature may provide readouts of ad sequences and impressions tracked for each ad that has been displayed by a display device 120 or auxiliary display 210.

As shown in FIG. 2, it is contemplated that there may be a display device 120 and auxiliary display 210. Additionally, it is contemplated that there may be a variety of display devices and each display device may present similar game-related information and similar additional content. However, it is contemplated that display devices, via a plurality of display devices 120 or auxiliary displays 210 may provide different game-related information. For example, display device 120 may provide team, score and time information and auxiliary display 210 may provide individual player statistic information. Also, the additional content, selected via producer, may be adjusted so that display device 120 includes different content and advertisements than what is shown on auxiliary display 210. It is contemplated, that in such an embodiment with different advertisements being placed on display device 120 and auxiliary display; that a first camera device 225 may be oriented towards display device 120 and a second camera device 225 may be oriented towards auxiliary display 210 to verify actual display of advertisements on both displays.

It is contemplated that system 100 as described in FIG. 2 may include one or more devices that may not be desired by a particular user. For example, initiator device 110D referred as practice may not be desired. However, operation of the system may be viable without inclusion of any of the components, rather, the components of system 100 of FIG. 2 may be selected to fit a particular user's requirements. Also, it is contemplated that one or more devices may be combined. For example, it is contemplated that shot clock controller and time clock controller could be combined into a single device in which a single user may be able to manage operation of the shot clock and the time clock via a single application working on a single initiator device without departing from the scope and intent of the present disclosure.

It is contemplated that entry of game-related information by initiator devices 110A-110F and photos and video may be captured by camera device(s) 225 may include a time stamp with each receipt of each piece of game-related information. Each piece of game-related information may include each update and may include the capture of images and video from camera devices(s) 225. The game-related information, with the time-stamp information associated with the game-related information, may be stored at the cloud-based server device 130. Advantageously, if there is a moment associated with a particular game, such as a made 3 point shot, additional information regarding the moment of time may be retrieved. It is contemplated that the game-related information associated with that made 3 point shot may include time-stamp information. With that time-stamp information, it may be possible to retrieve other game-related information associated at that particular point in time, including photos, videos, advertisements and additional content that were obtained or presented at the same point in time as the made 3 point shot. As a result, it may be possible to later retrieve all aspects of game-related information taken at a particular point in time from cloud-based server device 130.

It is contemplated that system 100 may be operable to work with social media sites such as TWITTER, FACE-BOOK, and INSTAGRAM. For example, receiver device 140 including the fan application may be employed to retrieve game-related information from cloud-based server device 130. Receiver device 140, through fan application, may request a subset of game-related information. This subset of game related information may include advanced statistical information regarding a particular player, such as a relative. It is contemplated that this advanced statistical information may be shared with others by a user via integration with a user's social media, including TWITTER, FACEBOOK, and INSTAGRAM.

Independent Content Tagging of Media Files

In one aspect, the present disclosure provides a method for producing a meta-tagged media file. In one embodiment, the method comprises: (a) correlating device time of a media-file generator with device time of a meta-tag generator; (b) recording an event to produce a media file in the media-file generator; (c) independently and simultaneously with the recording, generating at least one meta-tag with the meta-tag generator, wherein the meta-tag corresponds to a feature of the event; and (d) combining the media file and the at least one meta-tag to produce the meta-tagged media file, wherein the meta-tag is associated with the feature of the event recorded in the media file. In some cases, correlating device time of the media-file generator with device time of the meta-tag generator comprises synchronizing the media-file generator and the meta-tag generator. In some cases, the synchronizing occurs prior to recording the event. In one embodiment, synchronizing the meta-tag generator and the media-file generator is performed by (a) beginning recordation of a sync-clip on the media file generator, and (b) ending recordation of the sync-clip on the media file generator, wherein the beginning and/or ending of the sync-clip coincides with generation of a sync-tag on the meta-tag generator.

In some cases, the media file is a video file. In other cases, the media file is an audio file. In still other cases, the media file comprises both audio and video. Reference to a video file herein does not exclude the presence of audio unless otherwise indicated.

In some embodiments of the present disclosure, the media-file generator is a digital camcorder. The media-file generator can be any device capable of capturing digital audio and/or video of an event. In some cases, the media-file generator comprises two or more media-file generators. In some embodiments, a plurality of media-file generators may be used, including two, three, four, five, six, seven, eight, nine, ten, or more media-file generators.

In some embodiments, the meta-tag generator is selected from the group consisting of a computer, a laptop computer, a mobile device, a tablet computer, and a smart phone. In some cases, the meta-tag generator comprises two or more meta-tag generators. In some embodiments, a plurality of meta-tag generators may be used, including two, three, four, five, six, seven, eight, nine, ten, or more meta-tag generators.

In some cases, the media file is stored on a removable storage device in the media-file generator when it is produced. In one embodiment, the removable storage device is a secure digital (SD) card. The SD card can be a standard capacity, high capacity, or extended capacity card. Other types of digital storage media or devices will be familiar to the skilled artisan and are included within the meaning of removable storage device herein.

In some embodiments of the present disclosure, the event is a sporting event. In some cases, the sporting event is selected from the group consisting of a football game, a basketball game, a golf tournament, a tennis match, a water polo match, a volleyball game, a soccer game, a baseball game, a softball game, a gymnastics meet, a wrestling meet, a track meet, a cross-country meet, a lacrosse game, a hockey game, a field hockey game, a roller hockey game, a badminton match and a rugby match.

In another aspect, the present disclosure provides a method for producing a meta-tagged media file, in which the method comprises: (a) synchronizing a media-file generator and an event device; (b) recording an event to produce a media file in the media-file generator; (c) independently and simultaneously with the recording, generating at least one meta-tag with a meta-tag generator, wherein the meta-tag corresponds to a feature of the event; and (d) combining the media file and the at least one meta-tag to produce the meta-tagged media file, wherein the meta-tag is associated with the feature of the event recorded in the media file. In some cases, the synchronizing occurs prior to recording the event.

In some embodiments, the event device is the meta-tag generator. In other embodiments, the event device is not the meta-tag generator, and the method further comprises a step of correlating device time of the meta-tag generator with device time of the media-file generator prior to combining the media file and the at least one meta-tag.

In some cases, the event device is selected from a computer or a laptop computer.

In yet another aspect, the present disclosure provides a method of synchronizing a meta-tag generator and a media-file generator. In one embodiment, the method comprises: (a) beginning recordation of a sync-clip on the media file generator; and (b) ending recordation of the sync-clip on the media file generator, wherein the beginning and/or ending of the sync-clip coincides with generation of a sync-tag on the meta-tag generator. In one embodiment, the meta-tag generator is a computer, and the media-file generator is a digital camcorder.

In some embodiments, a user is prompted to begin and end recordation of the sync-clip. In some cases, the prompt comprises a timed countdown culminating in generation of the sync-tag. In some embodiments, the prompt is generated by the meta-tag generator.

In still a further aspect, the present disclosure provides an electronically accessible site (e.g., a web page or group of web pages) via which users can search and/or view meta-tagged media files prepared in accordance with the methods of the present disclosure.

The details of additional embodiments are set forth in the description below. Any or all of the features discussed above and throughout the application can be combined in various embodiments of the present disclosure. Other features and advantages will be apparent from the detailed description and the accompanying drawings, and from the claims.

I. Definitions

As used herein, the term "Device time" refers, unless otherwise indicated, to an internal time maintained by an electronic device, for example and without limitation, a computer, a laptop computer, a mobile device, a tablet computer, a smart phone, or any other electronic device used in accordance with the teachings of the present disclosure.

As used herein, the term "Event" refers, unless otherwise indicated, to a live event, including, for example and without limitation, a sporting event, a presentation, a demonstration, a performance, a speech, a lecture, or the like.

As used herein, the term "Event device" refers, unless otherwise indicated, to an electronic device capable of maintaining device time, and capable of executing a set of machine readable instructions to allow a user to enter data corresponding to an event, to prompt a user to generate a sync-clip, and to generate a sync-tag corresponding to a portion of the sync-clip. For example, and without limitation, an "event device" can be a computer or a laptop computer.

As used herein, the term "Feature" refers, unless otherwise indicated, to an aspect of an event, for example and without limitation, a period of play, a particular play or a particular play result during a sporting event.

As used herein, the terms "Independent" or "Independently" refer, unless otherwise indicated, to an absence of any physical connection. For example, in the context of independent media file and meta-tag generation in accordance with the present disclosure, the media-file generator and the meta-tag generator have no physical connection that would permit data transmission between the two devices while the media file and the meta-tags are being generated.

As used herein, the term "Media file" refers, unless otherwise indicated, to an audio, video, or audio/video file.

As used herein, the term "Media-file generator" refers, unless otherwise indicated, to an electronic device capable of maintaining device time, and capable of recording audio and/or video of an event. For example, and without limitation, a "media-file generator" can be a digital camcorder, a digital video camera, or the like.

As used herein, the term "Meta-tag" refers, unless otherwise indicated, to a machine-readable file comprising descriptive information about a feature of an event and a time-stamp.

As used herein, the term "Meta-tag generator" refers, unless otherwise indicated, to an electronic device capable of maintaining device time, and capable of executing a set of machine readable instructions to allow a user to generate meta-tags corresponding to features of an event. For example, and without limitation, a "meta-tag generator" can be a computer, a laptop computer, a mobile device, a tablet computer, or a smart phone.

As used herein, the term "Removable storage device" refers, unless otherwise indicated, to a machine readable storage medium that can be readily inserted and removed from an electronic device. For example, and without limitation, a "removable storage device" can be an SD card.

As used herein, the term "Simultaneously" refers, unless otherwise indicated, to the occurrence of two or more actions at the same, or at substantially the same, time. For example, in the context of simultaneous media file and meta-tag generation in accordance with the present disclosure, the media file and the meta tags are generated during an event, and the meta-tags are generated simultaneously with the generation of at least a portion of the media file.

As used herein, the term "Sync clip" refers, unless otherwise indicated, to a short (e.g., 5 seconds) media clip recorded on a media-file generator.

As used herein, the term "Sync tag" refers, unless otherwise indicated, to a meta-tag comprising a time-stamp corresponding to the beginning and/or end of a sync-clip.

As used herein, the term "Synchronizing" refers, unless otherwise indicated, to the co-generation of time-stamps in two or more devices such that the co-generated time-stamps are identifiable to permit correlation of device time between the two or more devices.

Embodiments of methods for generating meta-tagged media files are described in detail herein. In the following description, numerous specific details are provided, such as the identification of various system components, to provide a thorough understanding of embodiments. One skilled in the art will recognize, however, that the disclosure can be practiced without one or more of the specific details, or with other methods, components, materials, etc. In still other instances, well-known components or operations are not shown or described in detail to avoid obscuring aspects of various embodiments of the present disclosure.

Reference throughout this specification to "one embodiment" or "an embodiment" means that a particular feature, structure, or characteristic described in connection with the embodiment is included in at least one embodiment of the present disclosure. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more embodiments.

II. General

As an overview, the present disclosure relates to methods for producing a meta-tagged media file of an event (e.g., a video of a live sporting event) in which particular features of the event (e.g., periods of play or particular types of plays, including for example scoring plays) are associated with descriptive meta-tags to permit the features to be readily archived, searched, and/or located within the media file after conclusion of the event. The methods of the present disclosure are based, in part, on the correlation of time between the device or devices used to generate one or more media files (e.g., a digital camcorder) and the device or devices used to independently generate one or more meta-tags (e.g., a laptop computer) such that the media file and the meta-tags can be combined upon conclusion of the event to create a meta-tagged media file in which the meta-tags are properly associated with the corresponding portions of the media file.

As will be appreciated, each electronic device contemplated for use in the methods of the present disclosure (e.g., digital camcorders, laptop computers, tablet computers, smart phones, servers, and the like) has an internal clock which maintains device time that can be associated with each media clip or file and each meta-tag generated by the respective device. Correlation of these device times permits the generation of meta-tags during the course of the live event on one or more devices that are physically distinct from the device (or devices) used to generate the media file, thereby eliminating any requirement that the devices be interconnected (e.g., by a fire-wire cable) in order to produce a meta-tagged media file during the live event. The real-time generation of meta-tags also eliminates the often time-consuming process of adding meta-tags to a prerecorded media file.

In some cases, correlating the device times of two or more devices can be accomplished by synchronizing the devices via co-generation of time-stamps on each device. The co-generated time-stamps are identifiable and can be used to correlate the respective device times associated with each media file or segment thereof, and each meta-tag that corresponds to a feature of an event recorded in the media file.

In order to practice the methods of the present disclosure the correlated device times need not correspond precisely. In some cases, the correlated device times may differ by, e.g. as much as one or two seconds or more without detracting from the ability to properly associate meta-tags with their corresponding features in the media file. In a preferred embodiment, the correlated device times differ by no more than one second. In a more preferred embodiment, the correlated device times differ by less than one second (e.g., no more than 10 s or 100 s of milliseconds). Reference to a difference in this context between correlated device times means that when a meta-tagged media file is produced, the meta-tag will correspond to the feature of the event recorded in the media-file to within, e.g., one second of the time at which that feature occurs in the media-file. For example, if a feature (e.g., a scoring play of a sporting event) begins at time X in a recorded media-file, the meta-tag generated for that feature preferably corresponds to a time of X±1 second when the device times are correlated to produce the meta-tagged media file. It will be appreciated that the actual device times (i.e., the internal clocks of the devices) may not correspond to one another as precisely as the correlated device times.

These and other advantages of the present disclosure will be apparent to the reader from the foregoing, and as the detailed description and discussion is read in conjunction with the accompanying drawings.

III. Generation of Meta-Tagged Media Files

Figure 12:
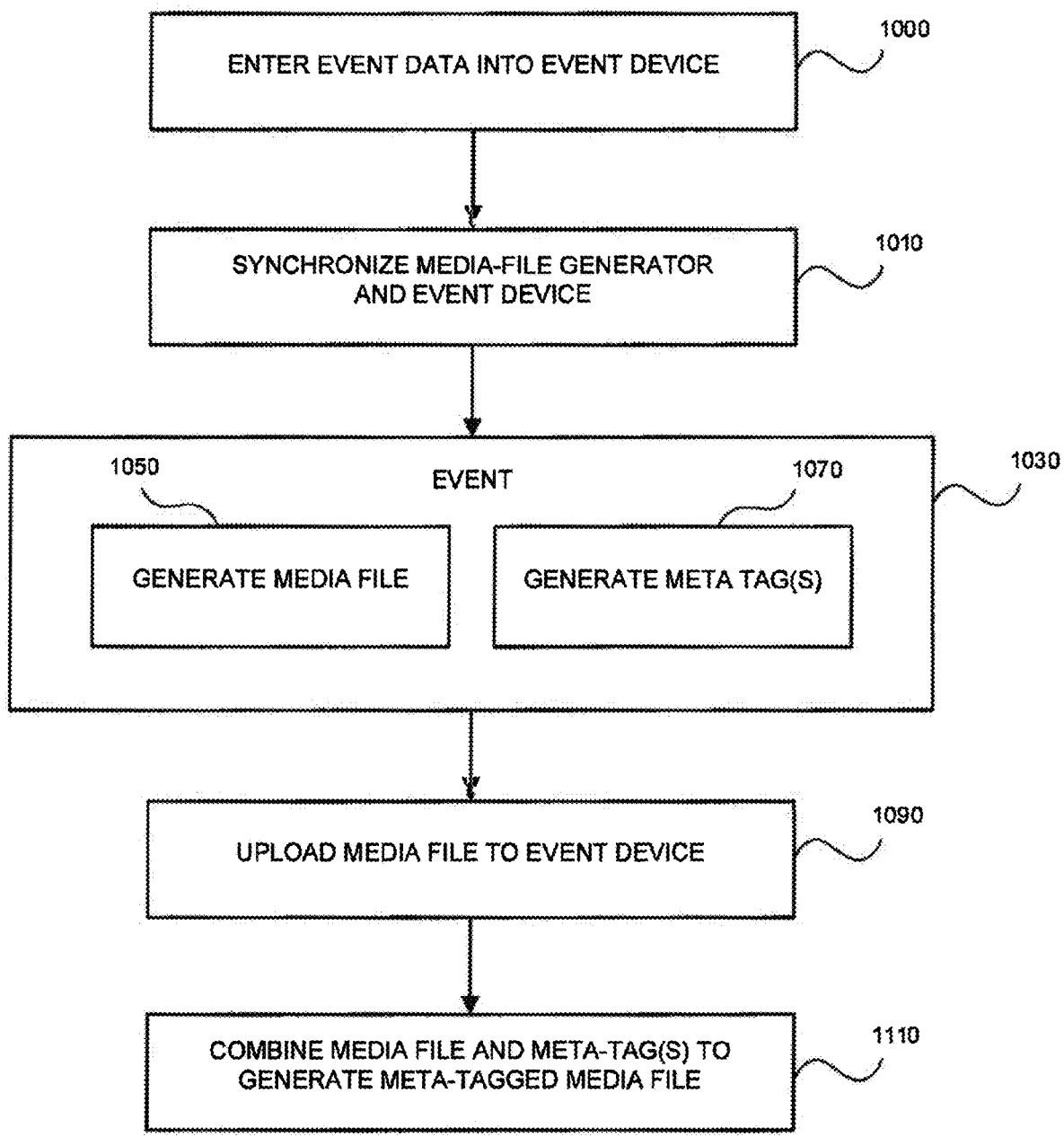
FIG. 12 is a flow diagram illustrating an exemplary flow of events in a process for generating a meta-tagged media file in accordance with an embodiment of the present disclosure.

With reference now to the drawings, and in particular to FIG. 12, there is illustrated a flow diagram of one embodiment of a method for generating a meta-tagged media file in accordance with the teachings of the present disclosure. In the illustrated embodiment, the method comprises, (a) entering event data into an event device 1000, (b) synchronizing a media-file generator and the event device 1010, (c) simultaneously and independently generating a media file 1050 and meta-tags 1070 during a live event 1030, (d) uploading the media file to the event device 1090, and (e) combining the media file and the meta-tags to generate a meta-tagged media file. In a preferred embodiment of the method illustrated in FIG. 12, the media-file generator is a digital camcorder that is used to record video of a live event (e.g., a sporting event), and the event device is a laptop computer, which, in one embodiment, is also used to generate the meta-tags, which correspond to features (e.g., plays) of the live event.

Although the methods of the present disclosure can be used in connection with the audio and/or video recordings of any live event, the methods are preferably used in connection with sporting events in which features of the event, for example, periods of play (e.g., 1st quarter, 2nd quarter, etc.), offensive and defensive sequences, scoring plays (e.g., touchdowns, goals, etc.), and the performance of individual players (e.g., John Doe) are of particular interest to coaches, participants and/or fans of the players, teams, or sport. In various embodiments, the sporting event may be a football game, a basketball game, a golf tournament, a tennis match, a water polo match, a volleyball game, a soccer game, a baseball game, a softball game, a gymnastics meet, a wrestling meet, a track and field meet, a cross-country meet, a lacrosse game, a hockey game, a field hockey game, a roller hockey game, a badminton match, or a rugby match.

Other events for which the methods of the present disclosure are useful include live presentations, demonstrations, performances, speeches, lectures, or other live events. Although the following discussion largely pertains to embodiments illustrating the methods of the present disclosure in the context of sporting events, the reader will understand that the same or similar techniques can be applied to other types of live events.

A. Entering Event Data

Figure 13A:
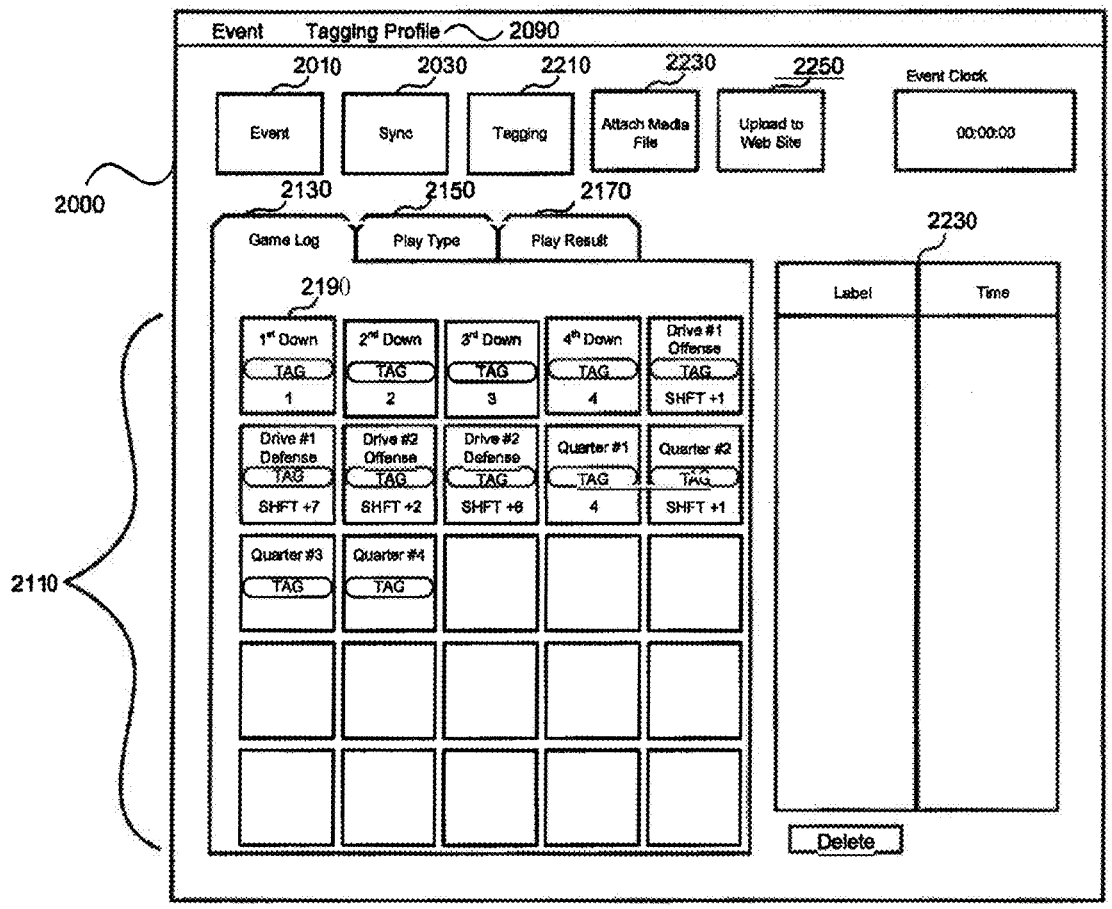
FIGS. 13A-13E are illustrations of an exemplary graphical user interface for use in performing the method illustrated in FIG. 12 in accordance with an embodiment.
Figure 13B:
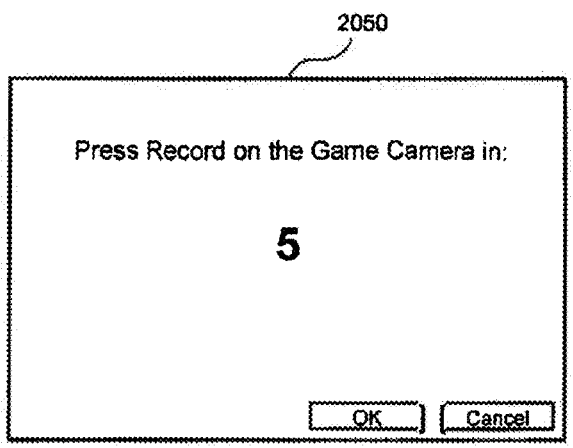
Figure 13C:
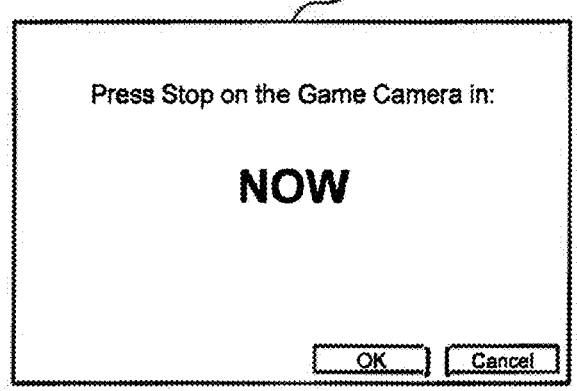

In one embodiment of the method illustrated in FIG. 12, a user can perform portions of the method using software executed on the event device, for which an exemplary graphical user interface (GUI) 2000 is shown in FIG. 13A. With reference now primarily to FIGS. 13A-13E, in one embodiment a user may select "New Event" 2010 on the GUI, which may open a dialog box with fields that allow the user to enter event specific information, e.g., a name for the event, the date the event is taking place, and the teams participating in the event. Although the event data may be entered prior to the event, the event data may also be entered at another time, e.g., following completion of the event.

B. Synchronization of Media-File Generator and Event Device

In one embodiment, after creating a new event, the user may select "Sync" 2030 on the GUI to synchronize the media-file generator and the event device. As discussed above, the present disclosure is based, in part, on the correlation of time between devices used to generate the media file and the meta-tags. In one embodiment, this correlation can be accomplished by synchronizing the media-file generator and the event device, which, in some cases, is also used to generate the meta-tags. For example, synchronizing the media-file generator and the event device may include recording a sync-clip on the media-file generator, and creating a corresponding sync-tag on the event device to correspond to the beginning and/or ending of the sync-clip. In some cases, synchronization of the media-file generator and the event device can be done before generation of the media file and the meta-tags. In other cases, synchronization can be done after generation of the media file and the meta-tags.

In one embodiment, selection of "Sync" 2030 by the user may open a dialog box that prompts the user to confirm that the media-file generator (e.g., a digital camcorder) is turned on and a removable storage device (e.g., an SD card) has been inserted into the media-file generator and correctly formatted to enable generation of the media file on the storage device. The user may confirm completion of these tasks by, for example, selecting "Next" or "OK" on the dialog box, which in turn may open a series of further dialog boxes which prompt the user to begin and stop recording the sync-clip on the media-file generator. For example, a dialog box 205 may appear prompting the user to begin recording the sync-clip on the media-file generator in, e.g., 5 seconds. The user may watch the countdown in the dialog box and press "Record" on the media-file generator as prompted by the dialog box. Then, in one embodiment, a second dialog box 2070 may appear prompting the user to stop recording the sync-clip on the media-file generator in, e.g., 5 seconds. Again, the user may watch the countdown in the dialog box until the dialog box displays "NOW" and again press "Record" on the media-file generator to stop recording the sync-clip. In one embodiment, the prompts for the user to begin and stop recording the sync-clip (e.g., the moment the prompt dialog box displays "NOW") correspond to the generation of one or more sync-tags in the event device. For example, a sync-tag may be generated at the prompt to stop recording the sync-clip. In this example, the end of the sync-clip and its associated device time (e.g., the internal time on the digital camcorder) will correspond to the event device time (e.g., the internal time on the laptop computer) associated with the sync-tag. Thus, upon conclusion of the event, the media file and its associated device times, and the meta-tags and their associate device times can be correlated based on the known relationship between the end of the sync-clip and the sync-tag.

C. Generation of Media File and Meta-Tags

Figure 13D:
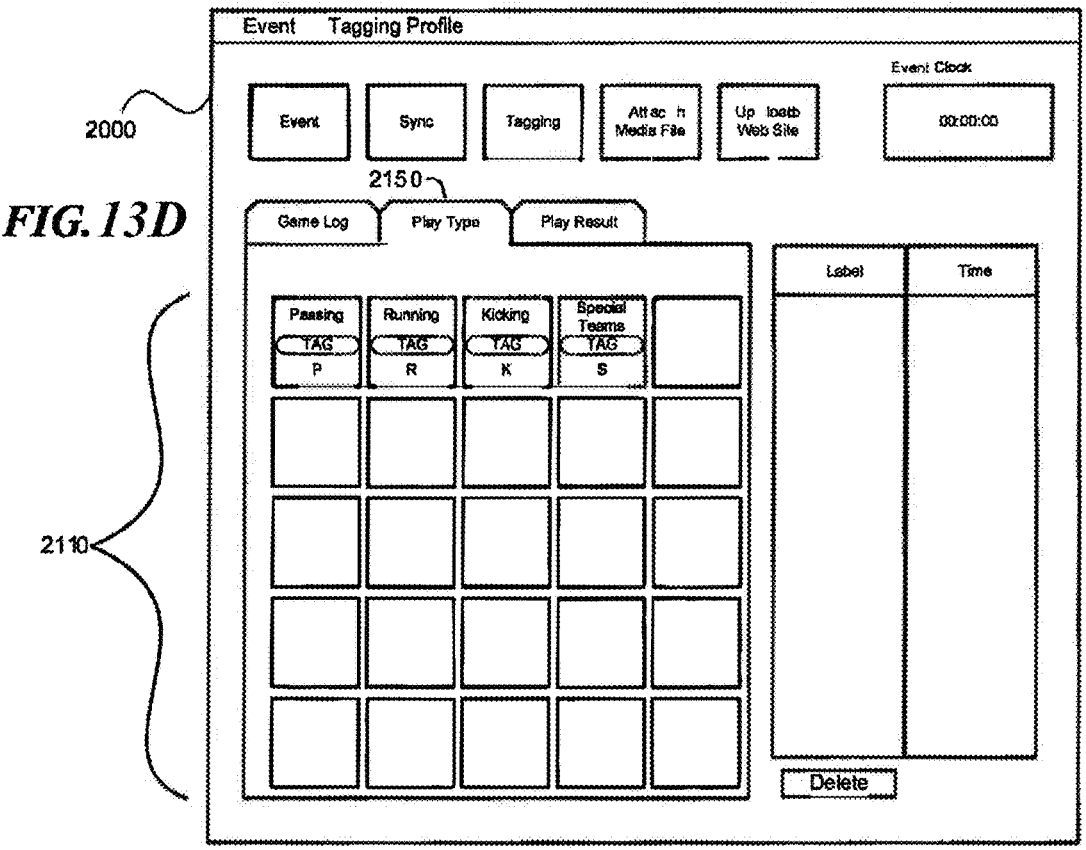
Figure 13E:
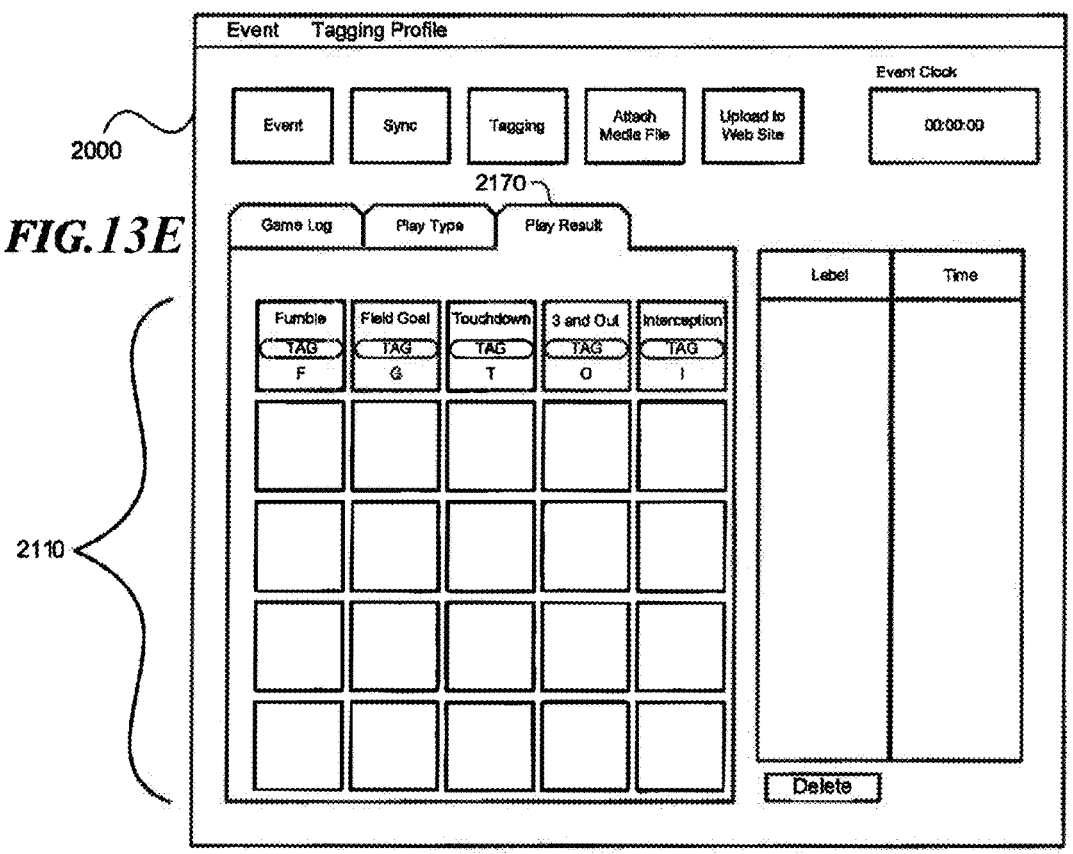

In accordance with the present disclosure, the media file corresponding to the event and the meta-tags corresponding to features of the event are generated simultaneously, but independently during the course of the event. In one embodiment, a user may select a "Tagging Profile" 2090 from, e.g., a drop-down menu in the GUI on the event device. In some cases, the tagging profile may permit the user to select from among a list of specific types of events, for example, different types of sporting events, so that a number of commonly used tags corresponding to that type of event are made available to the user. For example, if the user selects a tagging profile corresponding to a football game, a number of tags corresponding to particular features of a football game may be automatically populated into a tag matrix for use during the course of the event. As illustrated in FIGS. 13A, 13D and 13E, a tag matrix 2110 may comprise an array of tags corresponding to, e.g., different features of the game (tab 2130), different types of plays (tab 2150), and different play results (tab 2170). For example, a particular tag 2190 may correspond to a "1st Down" play and may be associated with a hot key (e.g., the number 1) on the event device keyboard (or the keyboard or touch screen of another meta-tag generator, as will be discussed in greater detail below) to permit a meta-tag corresponding to that feature of the event to be readily generated. In some cases, the user may also create their own tags unique to their particular objectives or the players participating in the sporting event.

To begin generating meta-tags corresponding to the event, a user may select "Tagging" 2210 on the GUI, in an embodiment. During the course of the live event, the user may then select the appropriate tags from the tag matrix or use the appropriate hot keys corresponding to the tags in the tag matrix to generate one or more meta-tags corresponding to particular features of the event. Each meta-tag comprises user-defined descriptive information (e.g., 1st Down) as well as a time-stamp generated by the meta-tag generator at the time the meta-tag is generated.

Figure 14A:
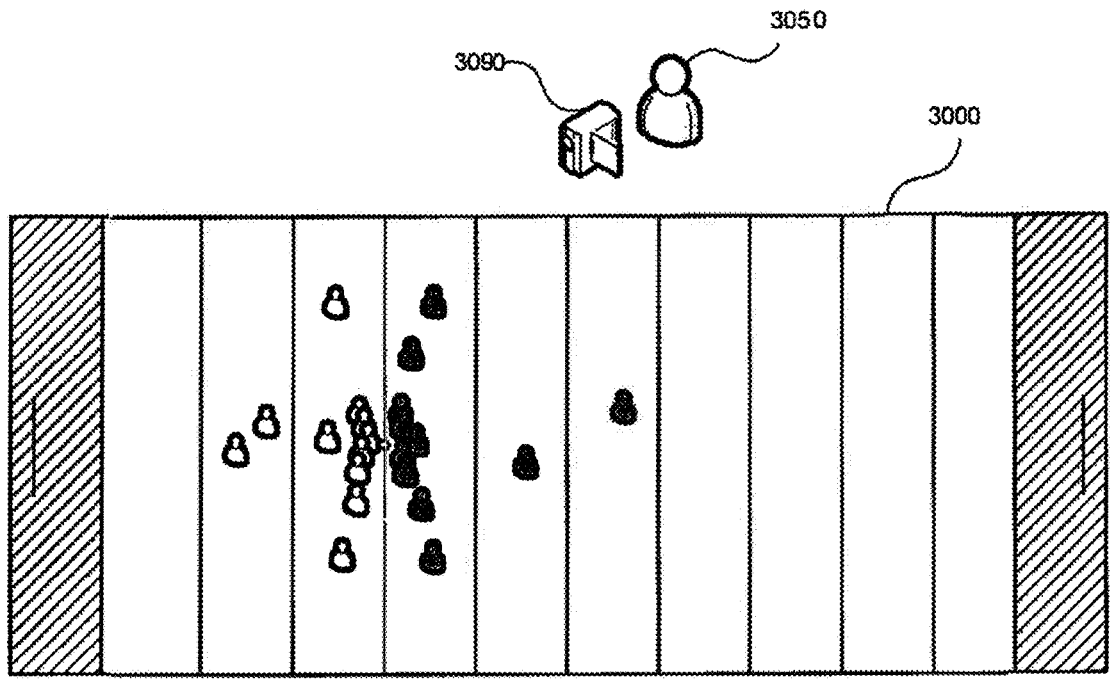
FIG. 14A is an illustration showing an exemplary event (e.g., a football game) at which a media file (e.g. a video) of the event and meta-tags corresponding to features of the event are independently and simultaneously generated in accordance with an embodiment.

With reference now primarily to FIG. 14A, the generation of a series of meta-tags 3010 and a media file 3030 for a football game 3000 is illustrated as an example of how the meta-tags and the media file are independently generated during the course of a live event. In the illustrated embodiment of FIG. 14A, a videographer 3050 records a series of video segments 3070 on a digital camcorder 3090, while a user 3110 independently and simultaneously generates individual meta-tags 3130 corresponding to features of the football game on a laptop computer 3150. As will be appreciated, the media file (e.g., the game video) may include the entire game or may include only a series of video segments as shown in FIG. 14A, which may, for example, exclude those portions of the game in which no relevant activity is occurring (e.g., time-outs, time between periods of play, etc.). In one embodiment, the meta-tags and their corresponding device times may be displayed in a window 2230 on the event device, which may permit a user to delete particular tags, if desired.

In some embodiments, it may be desirable to include a time-offset in connection with some types of meta-tags based on pre-determined considerations, or as specified by a user when establishing a particular tagging profile, such that the meta-tags are associated with an earlier or later point in the media file when the meta-tagged media file is generated than would otherwise occur based on the time correlation between the media-file generator and the meta-tag generator. For example, during the course of an event (e.g. a football game), a user may generate a meta-tag corresponding to a particular feature (e.g., a touchdown) that corresponds to a segment of the media file that precedes the time at which the meta-tag is generated. In this case, it would be desirable to place the meta-tag at or near the beginning of the segment that corresponds to the particular feature. For instance, if the meta-tag corresponds to a touchdown in a football game, a viewer watching the meta-tagged video after the game may be interested in seeing the entire play that corresponds to the touchdown. If the meta-tag corresponding to the touchdown is offset by, e.g., 10 seconds, such that in the final meta-tagged media file the particular meta-tag corresponds to a point in the media file that is 10 seconds prior to the touchdown, the viewer will be able to see the entire play which led to the touchdown.

In one embodiment, a user may manually modify the time-offset of any particular meta-tag during or after the event. As will be appreciated, the time-offset may be any appropriate time period (e.g., 1, 2, 3, 4, 5, 10, 20, 30 or more seconds) that results in placement of the meta-tag in the appropriately corresponding position in the media file when the media file and the meta-tag are combined.

D. Combining Meta-Tags with Media Files

Figure 14B:
FIG. 14B is an illustration of a meta-tagged media file generated from the meta-tags and the independent media file shown in FIG. 3A.

Upon completion of the event, a user may select "Attach Media File" 2230 (shown in FIG. 13A), and upload the media file and the corresponding sync-clip from the media file generator to the event device, in an embodiment. For example, the media file and the corresponding sync-clip may be stored on a removable storage device, such as an SD card in the media-file generator. In this situation, the user can remove the storage device and insert it into a port on the event device to upload the media file and the sync-clip. Using the time correlation between the sync-clip uploaded from the media-file generator, and the sync-tag generated in the event device, the series of meta-tags 3010 (see FIG. 14A) and the media file 3030 (see FIG. 14A) can be combined to generate a meta-tagged media file 3170 (see FIG. 14B) in which the meta-tags are associated with the corresponding features of the event at the appropriate points within the media file, which in one embodiment, comprises a contiguous video file compiled from the series of video segments 3070 (see FIG. 14A) recorded during the course of the event.

In one embodiment, the content data corresponding to an event and the meta-tags corresponding to features of the event are contained within an XML file in which each meta-tag includes descriptive information regarding the corresponding feature of the event it is intended to identify, and a time-stamp corresponding to the device time in the meta-tag generator which was used to generate the meta-tag. Optionally, the XML file also includes a time-offset associated with the meta-tag.

In one embodiment, the meta-tagged media file can then be uploaded to a web site or server by a user for archiving and viewing by interested parties, as discussed more fully below. In one embodiment, a user may select "Upload to Web Site" 2250 in the GUI on the event device, which, when connected to an appropriate network, will enable the meta-tagged media file to be uploaded to a server and subsequently made available for searching (e.g., via meta-tags), viewing, and/or for manipulating to make highlight video clips and the like.

E. Multiple Meta-Tag Generators

Figure 15:
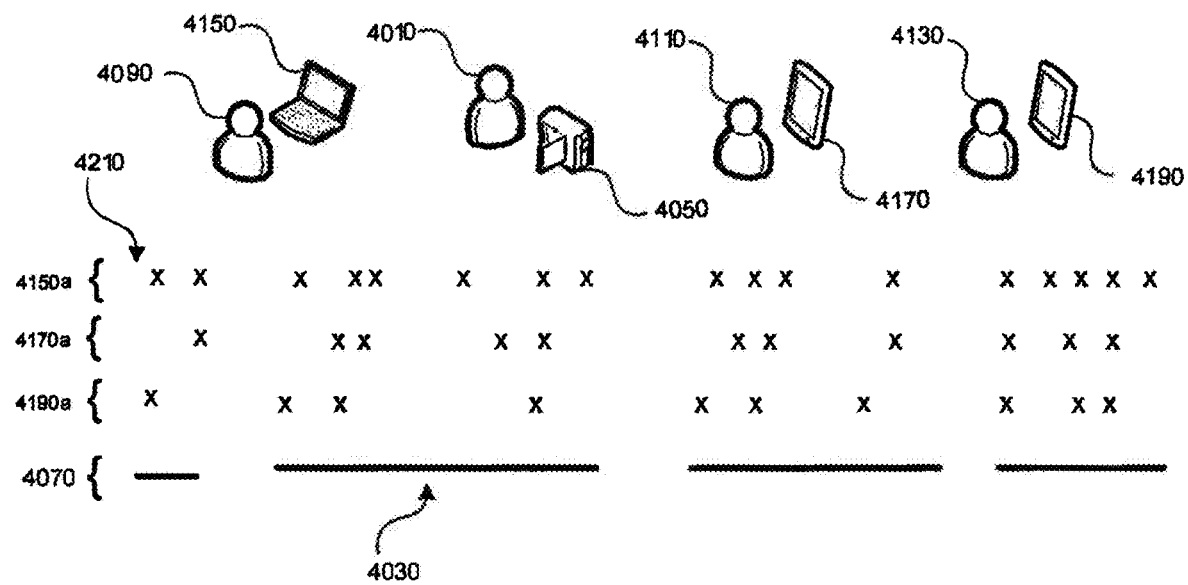
FIG. 15 is an illustration showing an embodiment in which a plurality of meta-tag generators (e.g., laptops or mobile devices) are used in conjunction with a single media-file generator (e.g., a digital camcorder) to generate a single media file (e.g., a video) of an event and a plurality of meta-tag files comprising meta-tags corresponding to features of the event in accordance with an embodiment.

In some cases, the methods of the present disclosure include the use of multiple meta-tag generators operated independently during the course of an event. With reference now to FIG. 15, an embodiment of a scenario is illustrated in which multiple meta-tag generators are used in conjunction with a single media-file generator. In the illustrated embodiment, a videographer 4010 records segments 4030 of an event with a digital camcorder 4050 to produce a media file 4070. Independently and simultaneously, three different users 4090, 4110 and 4130, generate three different sets of meta-tags 4150a, 4170a and 4190a using a laptop computer 4150 and a pair of mobile devices 4170 and 4190, respectively. As discussed above, each individual meta-tag 4210 corresponds to a feature of the event.

Depending on the number of meta-tags that are desired in connection with any particular event, it may be advantageous to have individual users be responsible for the generation of different types of meta-tags. For example, in a sporting event such as a football game, one user may generate meta-tags corresponding to defensive sequences and a second user may generate meta-tags corresponding to offensive sequences, or the like, while still a third user generates meta-tags of particular interest to the coaching staff, individual players, or the like. At the conclusion of the event, the meta-tag sets 4150a, 4170a and 4190a from each of the respective meta-tag generators 4150, 4170 and 4190 can be combined with the media file 4070 to generate the meta-tagged media file, as discussed above. In those instances such as that shown in FIG. 15, in which a device or devices other than the event device is/are used to generate meta-tags, the device time corresponding to each of the meta-tags can be correlated with the device time of the corresponding media file by correlating the event device time (e.g., the laptop computer time) with the device time of the other meta-tag generator(s) (e.g., mobile devices) at the time the meta-tags are uploaded to the event device. This type of correlation is discussed in greater detail below in connection with FIG. 18.

F. Multiple Media-File Generators

Figure 16:
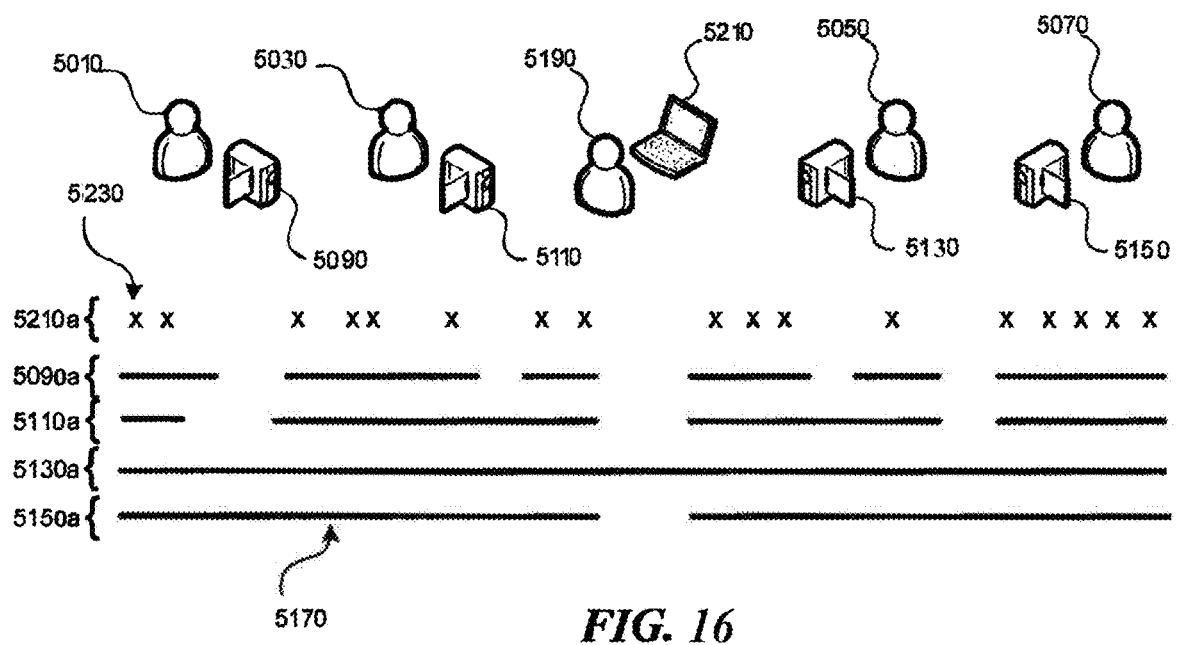
FIG. 16 is an illustration showing an embodiment in which a plurality of media-file generators (e.g., digital camcorders) are used in conjunction with a single meta-tag generator (e.g., a laptop) to generate a plurality of media files (e.g., videos) of an event and a single meta-tag file comprising meta tags corresponding to features of the event in accordance with an embodiment.

In some cases, the methods of the present disclosure include the use of multiple media-file generators operated independently during the course of an event. With reference now to FIG. 16, an embodiment of a scenario is illustrated in which multiple media-file generators are used in conjunction with a single meta-tag generator. In the illustrated embodiment, videographers 5010, 5030, 5050 and 5070 independently record segments 5170 of an event with digital camcorders 5090, 5110, 5130 and 5150 to produce media files 5090a, 5110a, 5130a and 5150a, respectively. Independently and simultaneously, a user 5190 generates a set of meta-tags 5210a using a laptop computer 5210. As discussed above, each individual meta-tag 5230 corresponds to a feature of the event.

In some cases, it may be advantageous or desirable to generate multiple media files of the same event. For example, in the embodiment illustrated in FIG. 16, each of the four digital camcorders can be recording the event from different locations so that each media file comprises a different view or angle of the event. In the context of sporting events, the availability of different angles or views of any particular play may be of particular interest to the coaching staff, players and/or fans. When multiple media-file generators are used, each can be synced with an event device (e.g., a laptop computer) by generating a sync-clip and a corresponding sync-tag as discussed above to permit correlation of device times between the various media-file generators and the meta-tag generator. In the illustrated embodiment, the set of meta-tags 5210a can be correlated to each of the respective media files 5090a, 5110a, 5130a and 5150a to generate four different meta-tagged media files, each of which captures the event from a different perspective or angle.

In some cases the methods of the present disclosure include the use of both multiple media-file generators as well as multiple meta-tag generators, as discussed above.

G. Spectator Tagging

Aspects of the present disclosure make it possible for spectators attending an event (e.g., a sporting event) to generate their own unique meta-tags corresponding to features of the event that may be of particular interest to them. For example, friends or family members of a player participating in a sporting event may wish to tag particular features of the event highlighting participation by that particular player.

In one embodiment, a spectator of an event may download a tagging application for use on his or her mobile device (e.g., smartphone, tablet computer, or the like). The tagging application may, in some embodiments, allow the spectator to select a tagging profile like that discussed above in connection with FIG. 13A, and/or to create unique tags customized to the spectator's particular objectives (e.g., a tag associated with a particular player's name or uniform number). In some cases, the tagging application may permit the spectator to generate meta-tags using the touchscreen of their device, which may, in some cases, feature a tag matrix like that discussed above and illustrated in FIG. 13A (see 2110).

Figure 17:
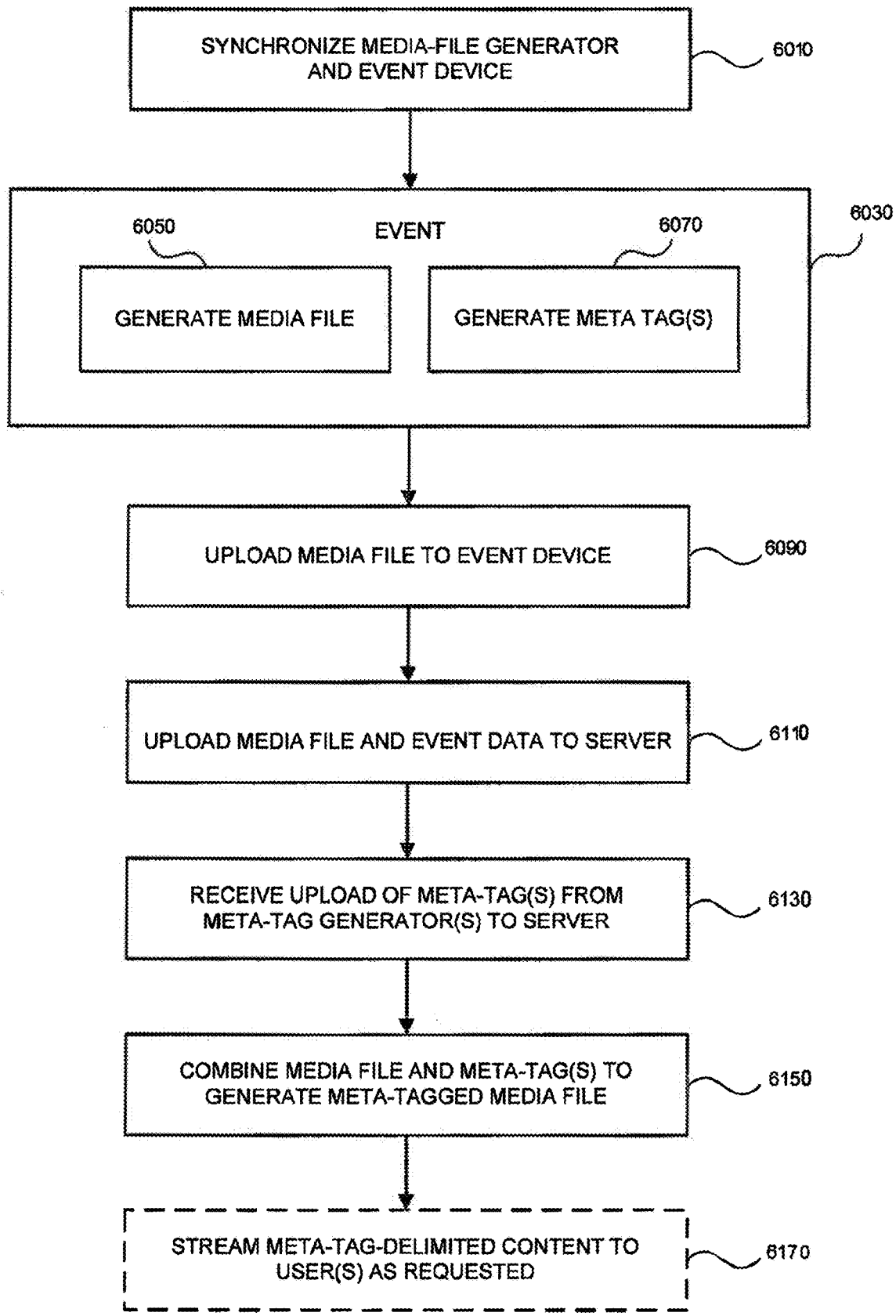
FIG. 17 is a flow diagram illustrating another exemplary flow of events in a process for generating a meta-tagged media file, and optionally streaming meta-tag-delimited content to users in accordance with an embodiment of the present disclosure.

With reference now to FIG. 17, there is illustrated a flow diagram of another embodiment of a method for generating a meta-tagged media file in accordance with the teachings of the present disclosure. In the illustrated embodiment, the method comprises, (a) synchronizing a media-file generator and the event device 6010, (b) simultaneously and independently generating a media file 6050 and meta-tags 6070 during a live event 6030, (c) uploading the media file to the event device 6090, (d) uploading the media file and, optionally, event data to a server 6110, (e) receiving an upload of one or more meta-tags from one or more meta-tag generators 6130, (f) combining the media file and the meta-tags to generate a meta-tagged media file, and (g), optionally streaming the meta-tag delimited content to users via a network upon request. In one embodiment, the method further comprises entering event data into the event device, as discussed above in connection with FIG. 12. In a preferred embodiment of the method illustrated in FIG. 17, the media-file generator is a digital camcorder that is used to record video of a live event (e.g., a sporting event), the event device is a laptop computer, and the meta-tag generator(s) are mobile devices (e.g., smart phones or tablet computers) executing a tagging application, as discussed above, to generate meta-tags corresponding to features of the event. In some cases, the event device may also be used to generate meta-tags, which are uploaded to the server along with the media file and the optional event data.

Figure 18A:
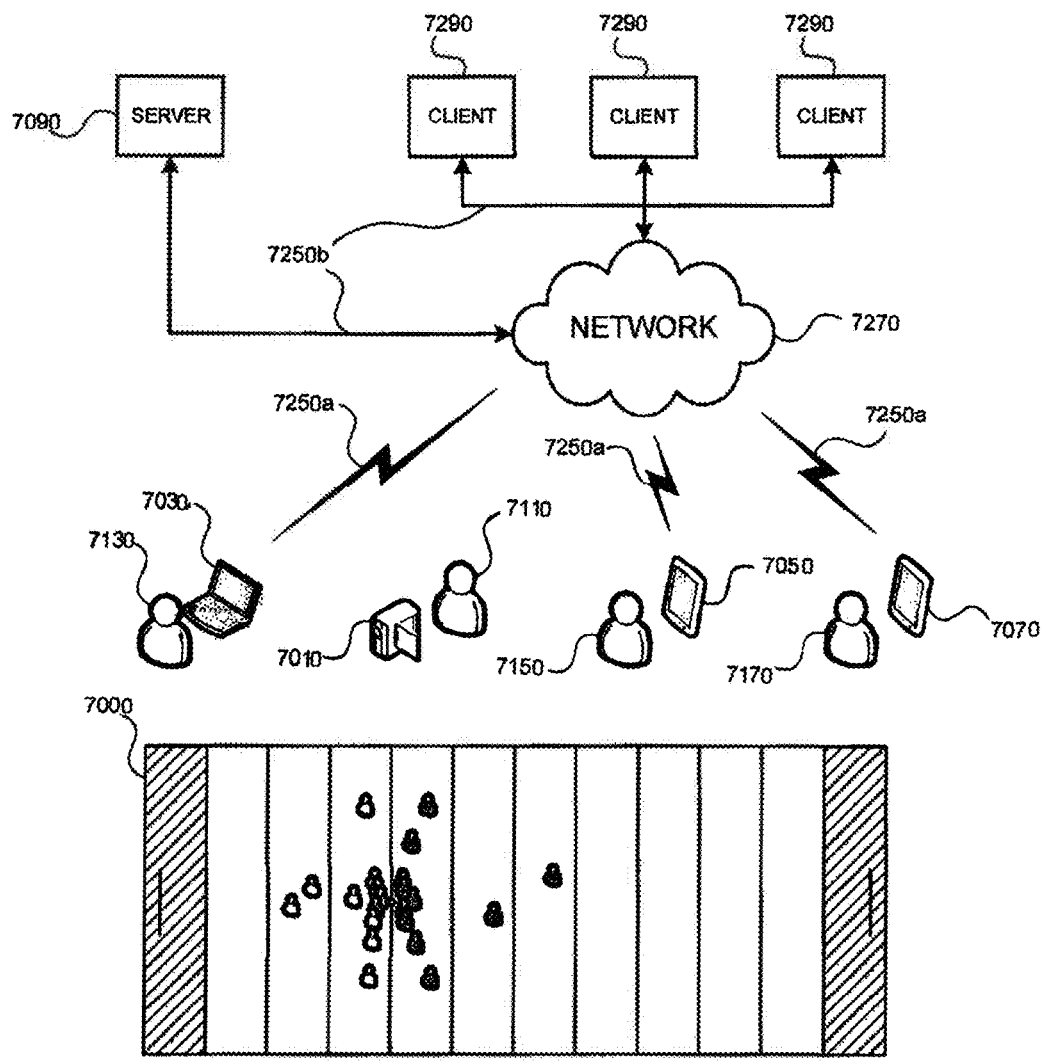
FIG. 18A is an illustration showing an exemplary event (e.g., a football game) at which a media file (e.g., a video) of the event and meta-tags corresponding to features of the event are independently and simultaneously generated and uploaded to a server in accordance with an embodiment.
Figure 18B:
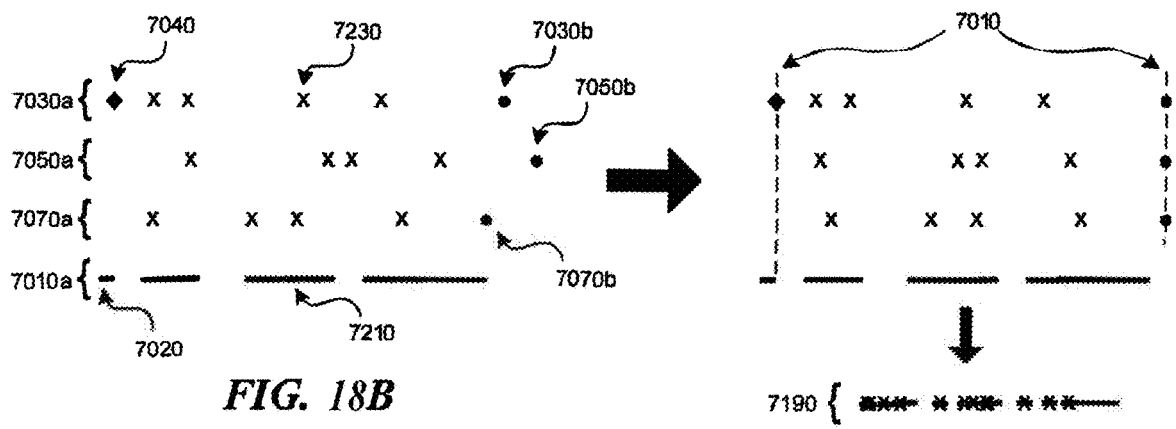
FIG. 18B is an illustration showing how several sets of meta-tags from different meta-tag generators can be correlated to a media file to generate a meta-tagged media file in accordance with an embodiment.

With reference now primarily to FIGS. 18A and 18B, there is illustrated an exemplary event (e.g., a football game)

7000 at which a media file (e.g. a video) 7010a of the event and several sets of meta-tags 7030a, 7050a and 7070a corresponding to features of the event are independently and simultaneously generated and uploaded to a server 7090, as well as an illustration showing the correlation of the several sets of meta-tags from different meta-tag generators 7030, 7050 and 7070 with the single media file 7010a to generate a meta-tagged media file 7190 in accordance with an embodiment. In the illustrated embodiment shown in FIG. 18A, a videographer 7110 records segments 7210 of an event 7000 using a digital camcorder 7010 to generate a media file 7010a. Independently and simultaneously, users 7130, 7150 and 7170 generate sets of meta-tags 7030a, 7050a and 7070a using a laptop computer 7030 and two mobile devices 7050 and 7070, respectively. As discussed above, each individual meta-tag 7230 corresponds to a feature of the event.

Upon completion of the event, the media file 7010a, which, in one embodiment, includes a sync-clip 7020 may be uploaded to the event device (e.g., the laptop computer 7030) as discussed previously. In one embodiment, the event device (e.g., the laptop computer 7030) has a stored sync-tag 7040 that has a time-stamp corresponding to the time-stamp associated with the end of the sync-clip (which may have been generated as discussed above in connection with FIG. 13A). In one embodiment, the media file 7010a, and the meta-tag set 7030a from the event device are uploaded to a server 7090 via communication links 7250a and 7250b, and a network 7270, and the current time of the event device is communicated to the server to provide a correlation 7030b between the event device time and the server's internal time. Similarly, the meta-tag sets 7050a and 7070a from the other meta-tag generators (e.g., the mobile devices 7050 and 7070) are communicated to the server 7090 via communication links 7250a and 7250b and the network 7270, along with the current time of each of the mobile devices 7050 and 7070. These current device times provide a correlation 7050b and 7070b between the mobile devices and the server's internal time. The communication links 7250a and 7250b may be wireless or wired links as would be familiar to one of skill in the art.

Using the server's internal time correlation corresponding to each of the meta-tag sets (or the event data and/or media file upload from the event device), and the correlation between the sync-clip and the sync-tag, each of the meta-tag sets and the media file can be "aligned" (as illustrated at 7310) such that each of the meta-tags corresponds to the appropriate portion of the media file and the meta-tagged media file 7190 can be generated.

In some embodiments, the meta-tagged media file 7190 can then be streamed to viewers from the server 7090 at one or more client devices 7290 via communication links 7250b, which may be wireless or wired links.

In some cases, users can generate their own unique meta-tagged media files by uploading their meta-tag set (and corresponding device time), which is then combined with the independently generated media-file to produce a user-specific meta-tagged media file. This allows, for example, a fan or family member of a particular player to create a meta-tagged media file containing only those meta-tags (which may have been player specific) that were generated by the fan or family member. In some cases, this may be a recruiting video.

IV. Archiving, Searching and Viewing Tagged Media Files

Meta-tagged media files produced in accordance with the methods of the present disclosure can be archived, searched and viewed based on, e.g., the content of the meta-tags associated with the media file. In a preferred embodiment, the media files can be searched and viewed via a web site that user's access via the internet. In one embodiment, users access the web site via a particular URL, and enter a user name and password to gain access to the web site. In some cases, different features of the web site may be available to different users based on, for example, the users' particular profile and relationship to, e.g., specific teams, players, schools, or the like.

Figure 19A:
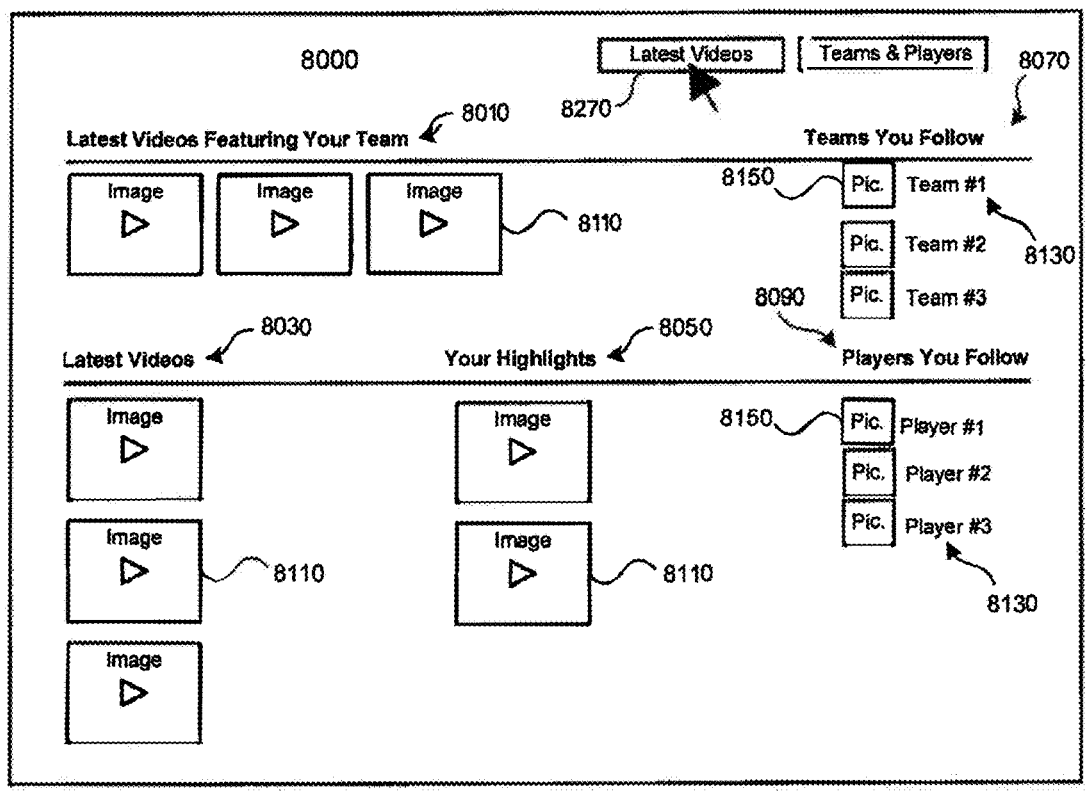
FIGS. 19A and 19B are illustrations of an exemplary graphical user interface for use in searching for, and viewing/listening to, media files in accordance with an embodiment. The illustrated graphical user interface may, for example, display pages from a web site.
Figure 19B:
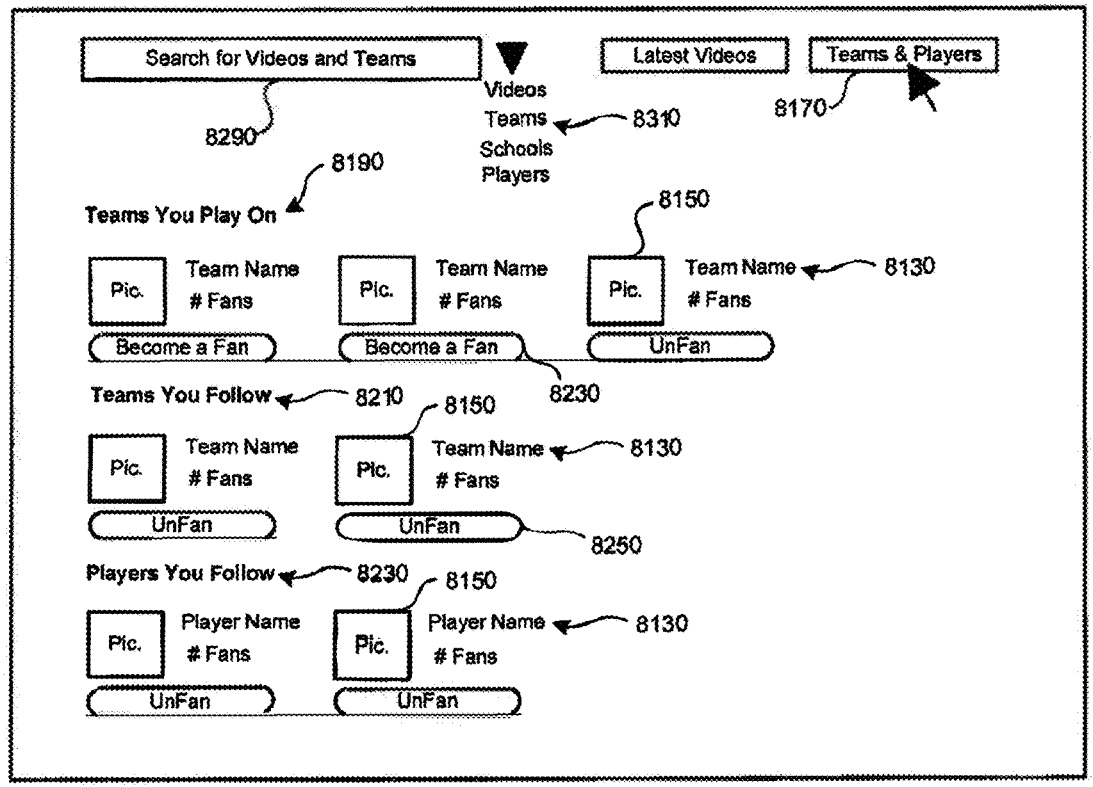

With reference now primarily to FIGS. 19A and 19B there is illustrated an exemplary view of a web page that may be accessible by a user in accordance with the present disclosure. In the illustrated embodiment, a user accesses a web page 8000 with, e.g., a particular user name and password. In some cases, the web page is user-specific, e.g., it identifies videos associated with the user's team 8010 (e.g., one or more teams on which the user participates as a player, or teams selected by the user), the latest videos of interest to the user 8030 (based on, e.g., the user's preferences), highlight videos of the user 8050, teams the user follows 8070, and/or players the user follows 8090. As will be appreciated, the web page may display thumbnail images of videos 8110, which link to the particular video, such that if the user clicks on the thumbnail image, the video plays in a window opened within, e.g., the user's browser. Names 8130 and/or pictures 8150 of teams and/or players may also be displayed. In some cases, a user may select a team or player by clicking the picture or name of the team or player, and may be directed to another web page specific to that team, player, or the like, as discussed further below.

In one embodiment, a user may select a "Teams & Players" tab 8170 to navigate to another web page that displays, e.g., teams on which the user plays 8190, teams the user follows 8210, and/or players the user follows 8230. As discussed above, the teams and/or players may be identified with a picture 8150 and/or by name 8130. In some cases, the user may edit his or her selections by "Becoming a Fan" or a team or player, or discontinuing the following of a particular team or player ("UnFan"). In one embodiment, the user makes the change by selecting a "Become a Fan" button 8230 or an "UnFan" button 8250, which edits the user's profile. In one embodiment, the user may navigate his or her way back to the prior latest videos web page by selecting a "Latest Videos" tab 8270.

In some cases, the web page(s) also include a search function, e.g., a field 82900 in which the user can enter search terms, for example, the name of a school, the name of a team, the name of a player, or particular terms associated with a video (e.g., School A vs. School B). In some cases, the user may select a filter from a drop-down menu 8310 to limit the user's search query to particular information (e.g., schools, teams, players, videos, or the like) stored in a database. A search may bring up a list of schools, teams, players, etc. with names, pictures, videos, as discussed above, which the user may then select to be directed to a further web page specific to that particular school, team, player, or the like, as illustrated in, e.g., FIG. 20.

Figure 20:
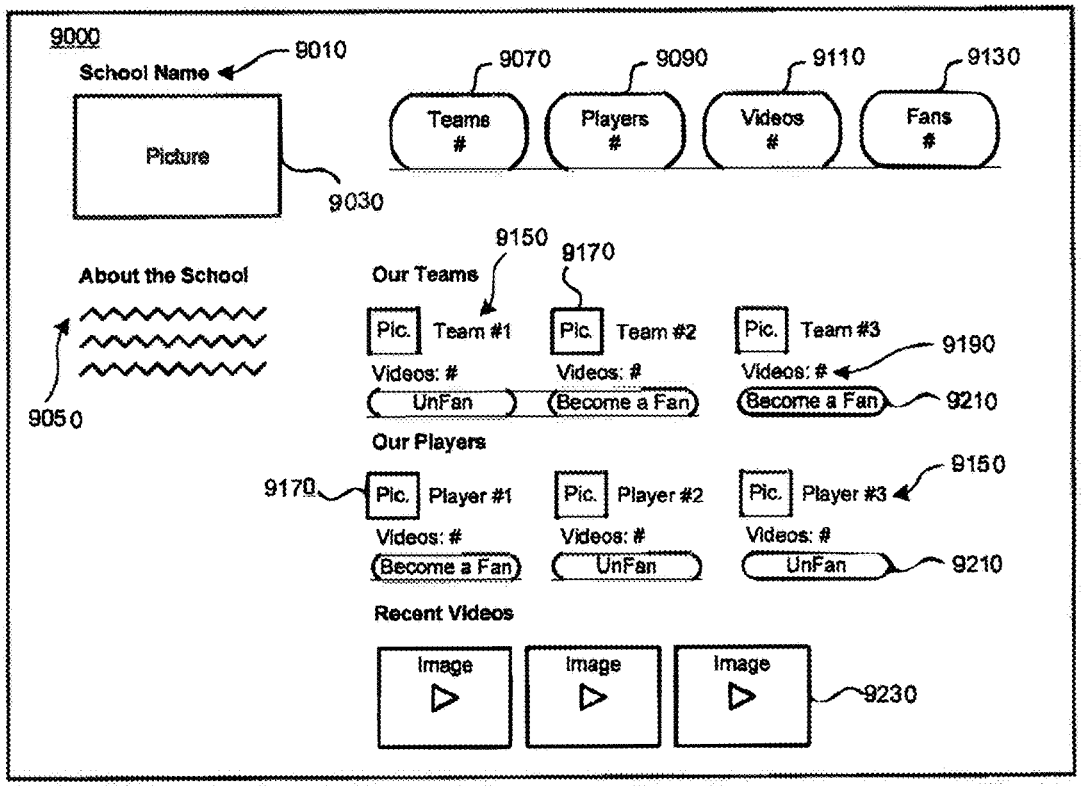
FIG. 20 is an illustration of a graphical user interface showing an exemplary web page corresponding to a particular school ("School Name"), and the teams, players, and videos associated with that school in accordance with an embodiment.

With reference now primarily to FIG. 20, there is illustrated an exemplary view of a web page 9000 specific to a particular school. As will be appreciated, similar pages specific to particular sports, leagues, teams, players, or the like may also be available. In the illustrated embodiment of FIG. 20, the school is identified by name 9010 along with a picture 9030. In some cases, descriptive information 9050 about the school, e.g., its location, mascot, enrollment, etc., may also be provided. In some cases, the number of teams 9070, the number of players 9090, the number of videos 9110, and the number of fans 9130 associated with the school may also be identified on the web page. In some cases, the teams and/or players of the school may be identified by name 9150 and/or with a picture 9170, as discussed above, along with a link 9190 to a number of videos associated with the team or player. In some cases, the user may select the name or picture associated with a team or player and be taken to yet a further web page specific to that team or player. The further web page is, in some cases, similar to that illustrated in FIG. 20, and may also include the identification of players, coaches, schedules and results, etc. for teams, and statistics and/or accomplishments of individual players, along with videos (e.g., thumbnail images that link to videos) specific to the team and/or player.

In some cases, the media files (e.g., videos) that are available to a user for watching/listening may depend upon the user's association with the school, team, player, etc. For example, fans of a particular team may have access to media files that other users do not, or players and coaches on a particular team may have access to media files that fans or other users do not. The web page may also provide the user with a button 9210 to "Fan" or "UnFan" particular teams or players, as discussed above, to permit the user to follow those teams or players with, e.g., alerts (e.g., e-mail or text message alerts) when new videos of the team or player are posted to the site. In some cases, the web page also includes thumbnail images 9230 of recent videos that the user may select to view the videos.

In some cases, permissions for particular access can be established by administrators (e.g., coaches of a team). In one embodiment, a coach may grant access to team videos to an opposing coach to facilitate "exchange of game videos" before an upcoming game between two teams. In one embodiment, an administrator may distinguish between "private" and "public" media files, and grant access to all media files for team members (e.g., coaches and players), but limit access by "fans" to only "public" media files.

Figure 21:
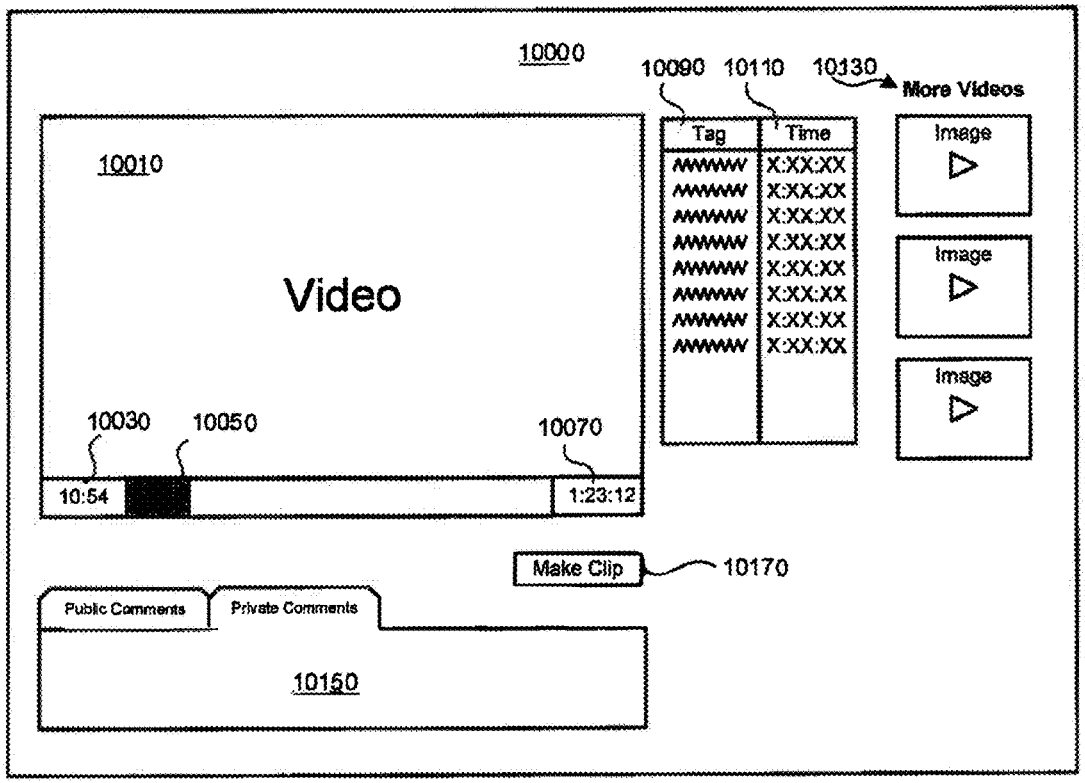
FIG. 21 is an illustration of a graphical user interface showing how a user may view a meta-tagged video and generate a highlight clip in accordance with an embodiment.

With reference now primarily to FIG. 21, there is illustrated an exemplary view of a web page 10000 that a user may be directed to when selecting a thumbnail image of a video from any one of, e.g., the web pages discussed above. In the illustrated embodiment, the video linked to the selected thumbnail is played in a window 10010 that shows, e.g., the current time 10030 within the video, a video status bar 10050 and the total time 10070 of the selected video. The view also shows a list of tags 10090 associated with the video and their corresponding times 10110 within the video being displayed in the window 10010. In one embodiment, a user may select a particular tag from the list, which will begin playback of the video from the time corresponding to the tag. In the view illustrated in FIG. 21, additional thumbnails of videos 10130 (e.g., related to the same team or player) may also be displayed.

In some cases, a user may be able to view and/or insert comments in a dialog box 10150 (which may be categorized as "public" or "private" with varying access, as discussed above) associated with the video.

In one embodiment, a user can also make a highlight clip from the video being viewed. For example, the user may click on a button 10170 (e.g., "Make Clip"), which may bring up a dialog box with fields to enter the start time of the desired clip within the current video, a field to name the clip, and a field to enter an optional description of the clip. After entering this information, the user may click another button to complete the process, and a clip beginning at the user-specified time, and with an either user-defined or pre-defined duration (e.g., 5, 10, 15, 20, 25, 30, 35, 40, 45, 50, or 55 seconds, or 1, 2, 3 or more minutes), preferably 30 seconds, is generated by extracting a copy of that portion of the video specified by the user. As will be appreciated, the highlight clip may correspond to a scoring play or other feature of an event that the user wishes to separately capture. In one embodiment, the newly created highlight clip may be displayed among the user's list of recent highlight clips 8050 (see FIG. 19A).

Figure 22:
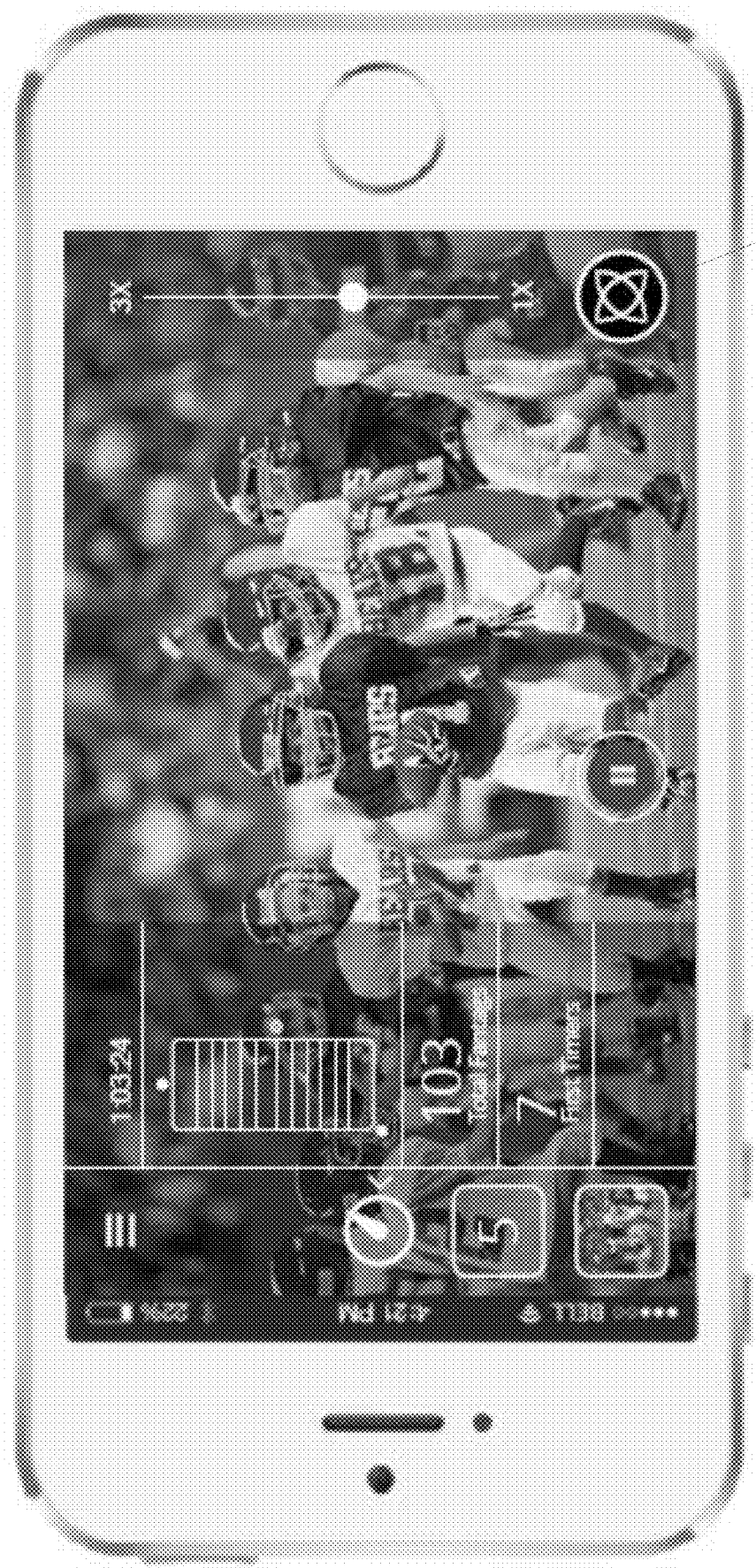
FIG. 22 illustrates a user interface presented to a user performing video capture by use of an example embodiment.

As described above with regard to FIGS. 18A and 18B, multiple users, each with their own video capture devices and capabilities (also denoted videographers), may independently and simultaneously capture the same event at the same time from different vantage points. Each independent user can be in data communication with a network and a server in support of the tagging and synchronization features described herein. Each independent user can also generate their own set of meta-tags identifying specific clips, highlights, or portions of the event represented by video clips (e.g., denoted highlights or highlight clips) of a particular pre-configured time duration. Each meta-tag can be independently generated by each of the different users based on the user's activation of an input signal on the user's device. For example, as shown in FIG. 22, a particular user at an event may have a mobile device with a video capture capability (e.g., an embedded video camera). The user may activate an application on the mobile device to generate a user interface for the user to control the capture of the video of the event and to enable an input signaling feature 7020 on the mobile device used by the user to activate an input signal when the user wishes to generate a meta-tag corresponding to a highlight of the event (denoted herein as a Fantag™ or the act of fan Tagging™). The input signaling feature 7020 on the mobile device (e.g., the meta-tag generation device) can be a button, icon, or other dynamic object of the mobile device user interface that can be activated by the user touching the touchscreen of the mobile device. When the user activates the input signaling feature 7020 on the user's mobile device, the example embodiment described herein can generate a meta-tag associated with the event with a timestamp corresponding to the time of the user's activation of the input signal. The information corresponding to the meta-tag can be transferred to the server in support of the tagging and synchronization features described herein. The video stream of the event captured by the user can also be transferred to the server in real time as the user continues recording. In a similar manner, any number of other users of video capture devices can transfer their own video streams and meta-tags to the server. As a result, the server can receive multiple video streams and multiple meta-tags corresponding to highlights and viewing angles from a plurality of users at an event. As described above, the server can synchronize the multiple video streams and multiple meta-tags to produce composite video streams with multiple meta-tags that capture the event from a plurality of different vantage points. These different vantage points can be captured as a plurality of different highlights and angles. Because the meta-tags can be synchronized to the video streams as described herein, the meta-tag created by a first user can be applied to that user's own video stream or the video streams captured by other users. As a result, upon playback of the composite video streams by a particular user, a first user can see a highlight and angle of the video stream captured by the first user, wherein the highlight and angle correspond to a meta-tag signaled by the first user. Moreover, the first user can also see a highlight and angle of the video stream captured by a second user, wherein the highlight and angle correspond to a meta-tag signaled by the first user. This feature allows the first user to see a desired highlight from more than one vantage point. Additionally, the first user can also see a highlight and angle of the video stream captured by the first user, wherein the highlight corresponds to a meta-tag signaled by the second user. This feature allows the first user to see a highlight signaled and shared by a second user. This feature enables different users to share meta-tags and corresponding highlights and angles captured independently and simultaneously. These features also enable different users to share video streams of an event captured independently and simultaneously.

Referring again to FIG. 22, the diagram illustrates a user interface presented to a user performing video capture by use of an example embodiment. The user interface shown in FIG. 22 includes an input signaling feature 7020 on the mobile device or other video capture device. The input signaling feature 7020 can represent a button, an object, dynamic object, icon, or other user interface mechanism for receiving an input from the user. In an example embodiment, the user can tap the object 7020 to activate the generation of a meta-tag or fantag as described above.

Figure 25:
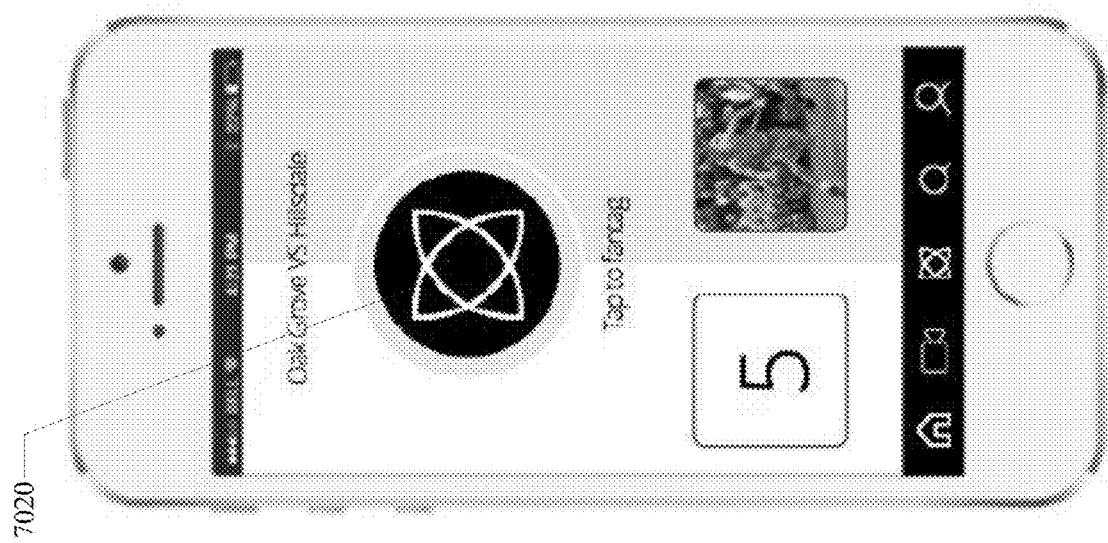
FIGS. 23 through 25 illustrate a user interface presented to a user performing event selection and the activation of an input signal for the generation of a meta-tag by use of an example embodiment.
Figure 24:
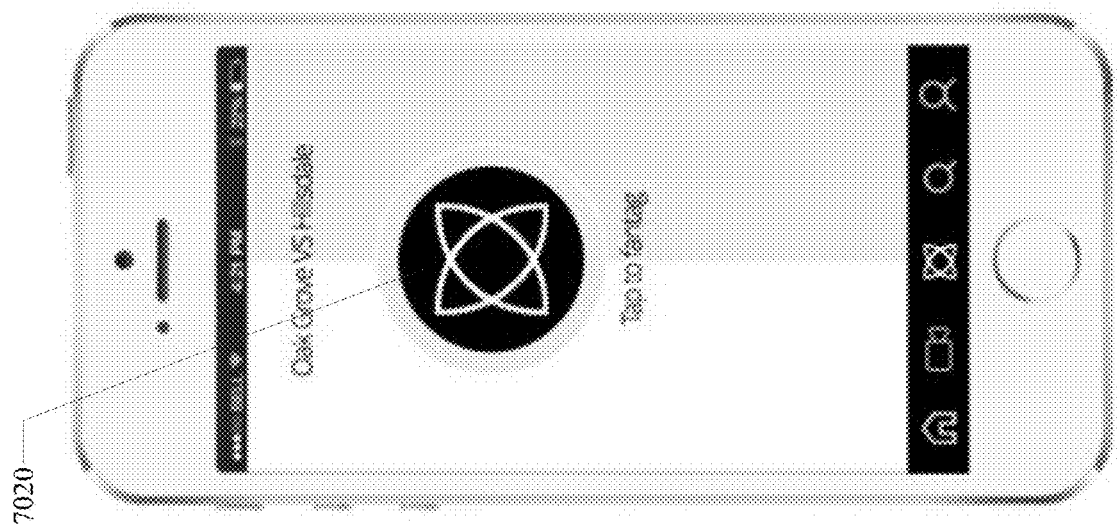
Figure 23:
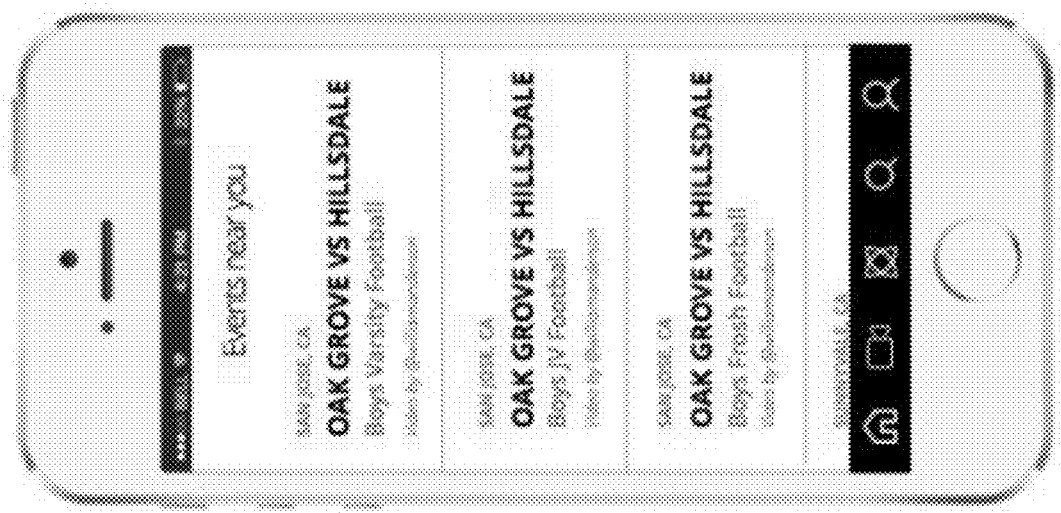

FIGS. 23-25 illustrate a user interface presented to a user performing event selection (FIG. 23) and the activation of an input signal 7020 (FIGS. 24 and 25) for the explicit generation of a meta-tag by use of an example embodiment.

In an example embodiment, the different users can compile a set of meta-tags, highlights, and corresponding videos of interest, captured themselves or by others, and share the compilations on a social media website, in a chat room, via email, or by other means. These compilations can be combined as highlights reels of the particular event. As a result, the video coverage of a particular event can be aggregated, meta-tagged by multiple parties, and shared among networked users. This video coverage of an event can be in real-time and with network connectivity to enable a live video capture and meta-tagging capability as enabled by the various embodiments described herein. Thus, the example embodiments disclosed herein enable the compilation and sharing of fantagged moments in highlight reels, wherein the fantags are automatically or manually triggered by videographers, other users, or third parties. These compilations can represent collections of fantagged moments produced into a single highlights reel or multiple highlights reels.

In an example embodiment, the video capture devices and video streams supported by the example embodiments described herein can include three-dimensional (3D) video, virtual reality (VR) video, augmented reality (AR) video, slow motion video, 360 degree video sources, or the like. Each of these different types of video streams can be meta-tagged and synchronized using the techniques described herein.

The various example embodiments described herein can be used to capture video and generate meta-tags and corresponding highlights for a variety of different types of events including: sporting events, presentations, demonstrations, performances, concerts, speeches, lectures, competitions, games, gaming events, video gaming, ESports events, VR/AR events, training exercises, military exercises, and any other type of event that can be captured by a video capture device.

Figure 26:
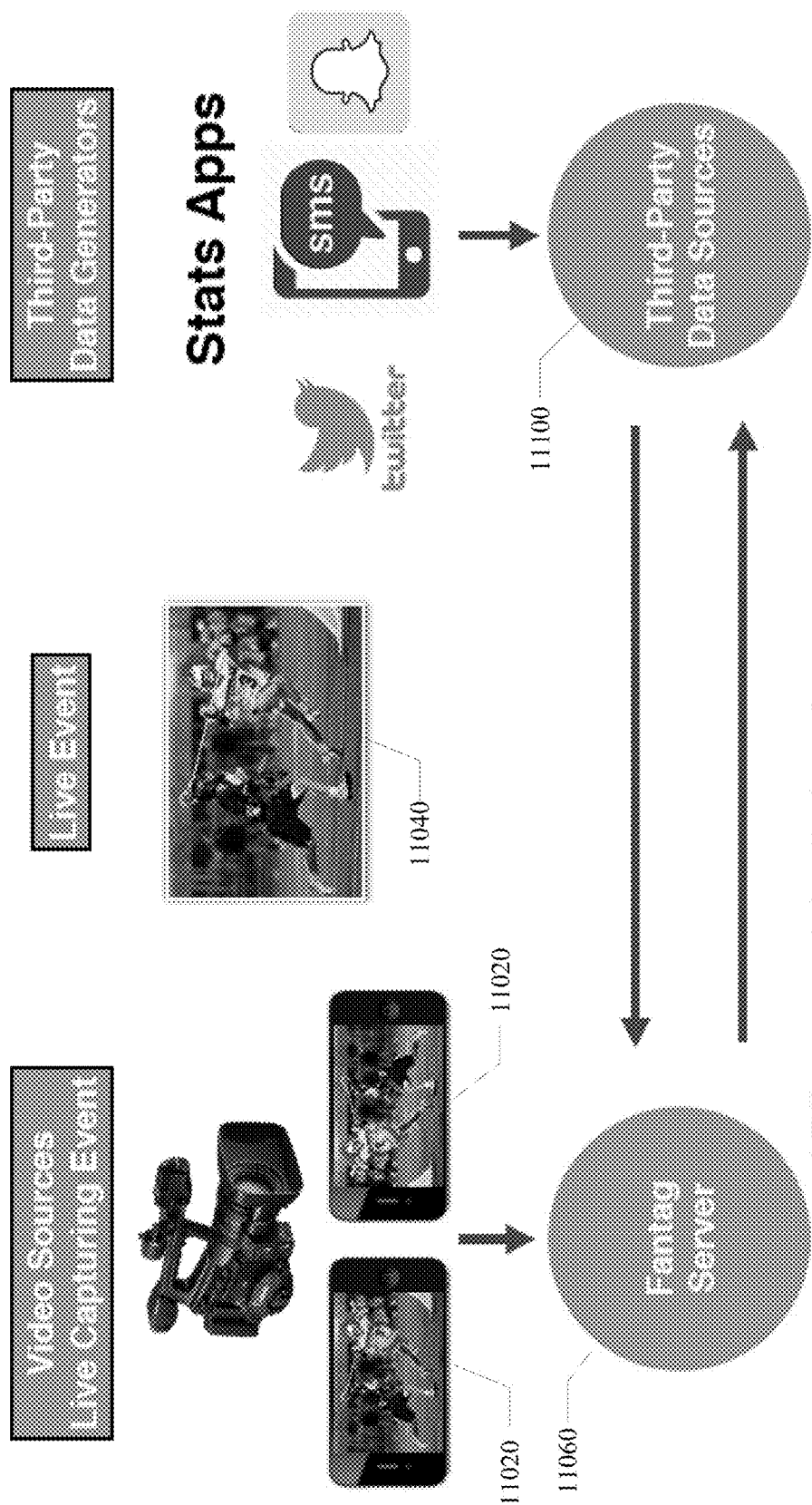
FIG. 26 illustrates an example of the use of an example embodiment to receive and synchronize video streams and associated implicit meta-tags from third parties via a data network.

FIG. 26 illustrates an example of the use of an example embodiment to receive and synchronize video streams and associated meta-tags from third parties via a data network. As described above and shown in FIG. 26, multiple users 11020 may independently and simultaneously capture video streams of the same event 11040 at the same time from different vantage points. Each independent user 11020 can be in data communication with a network and a server 11060 in support of the tagging and synchronization features described herein. As also described above, each independent user 1102 can use their meta-tag generation device (e.g., a user interface object or input signaling feature 7020 on a mobile device, etc.) to explicitly generate meta-tags corresponding to highlights of the video streams of the event 11040 by activating an input signaling feature 7020 on the meta-tag generation device. Additionally, an example embodiment disclosed herein also provides a feature enabling the implicit generation of meta-tags corresponding to highlights of the video streams of the event 11040. In this example embodiment, the independent user 11020 does not have to explicitly activate an input signaling feature on the meta-tag generation device to generate the meta-tag. Instead, a signal to generate a meta-tag (e.g., an implicit meta-tag generation signal) can be originated by a third party data source 11100 (e.g., Twitter™, Snapchat™, a chat application, an email application, a website, or other network-enabled data source). The implicit meta-tag generation signal can be pushed to the server 11060 by the third party data source 11100. In another implementation, the server 11060 can poll the third party data source 11100 and pull the implicit meta-tag generation signal to the server 11060. The server 11060 can receive the implicit meta-tag generation signal from the third party data source 11100 and cause the generation of meta-tags corresponding to highlights of the video streams of the event 11040. The implicit meta-tag generation signal can include information indicative of an identifier identifying the particular event, the particular video stream, the particular independent user 11020 who generated the video stream, and/or other identifying and timing information to associate the implicit meta-tag generation signal with the appropriate event or video streams. The server 11060 can use this information to synchronize the implicit meta-tag with the corresponding video streams. In all other respects, the implicitly generated meta-tag operates and performs just like an explicitly generated meta-tag as described above. By use of the implicit meta-tag generation signal and feature of an example embodiment, the meta-tags or fantags of a particular event can be explicitly generated by videographers or other users, implicitly generated by networked applications, generated locally, or generated remotely. As a result, the example embodiments can integrate fantags originated from anywhere and anything that is based on a particular event and a specific time. For example, an embodiment can implicitly integrate the action occurring at a particular sporting event with the standard statistics/scoring applications that are already provided for most sporting events. As a result, when a score (or other play of interest) at the sporting event is recorded by a person using the statistics/scoring application, the statistics/scoring application can be configured to generate the implicit meta-tag generation signal, which will automatically create a meta-tag (fantag) corresponding to the score or other play of interest. As such, the example embodiments can automatically associate a fantag and a corresponding synchronized videostream (captured asynchronously) with particular highlights of a specific event. In addition to statistics/scoring applications, the example embodiments can support #fantag tweets, SMS messages, sensors, wearable devices, and a variety of other means for generating the implicit meta-tag generation signal to trigger a fantagged moment.

As described above, each highlight or highlight clip corresponding to a meta-tag or fantag can be of a particular pre-configured time duration. Thus, when a user explicitly signals the generation of a meta-tag or a third party implicitly signals the generation of a meta-tag, a portion of the corresponding video stream of a particular pre-configured time duration is associated with the meta-tag. The meta-tag is synchronized with the video stream so the start time of the meta-tag is known. Given the pre-configured time duration, the end time of the meta-tag can also be determined. As a result, the user does not have to explicitly start and stop the fantagged highlight. The pre-configured time duration of each meta-tag can be configured by the user through the user interface or other configuration means. The pre-configured time duration can be varied based on the type of event, date/time, the identity of the user, the identity of the video stream, the identity of the source of the meta-tag, or other variables. Additionally, the start time associated with a meta-tag can be configurably varied or offset to "back up" or "move forward" by a configurable length of time. The example embodiment thereby provides a pre-configured start time offset. As a result, the example embodiment can configurably vary the start time of a fantag moment and configurably vary the duration of the fantag moment based on a variety of factors including, user behavior and/or the event type. For example, soccer may have a longer "moment" duration (e.g., the time duration associated with a meta-tag) than basketball as the play in soccer takes longer to develop than the play in basketball. Thus, the pre-configured time duration and pre-configured start time offset can be specifically configured for a soccer event relative to a basketball event, for example.

Figure 27:
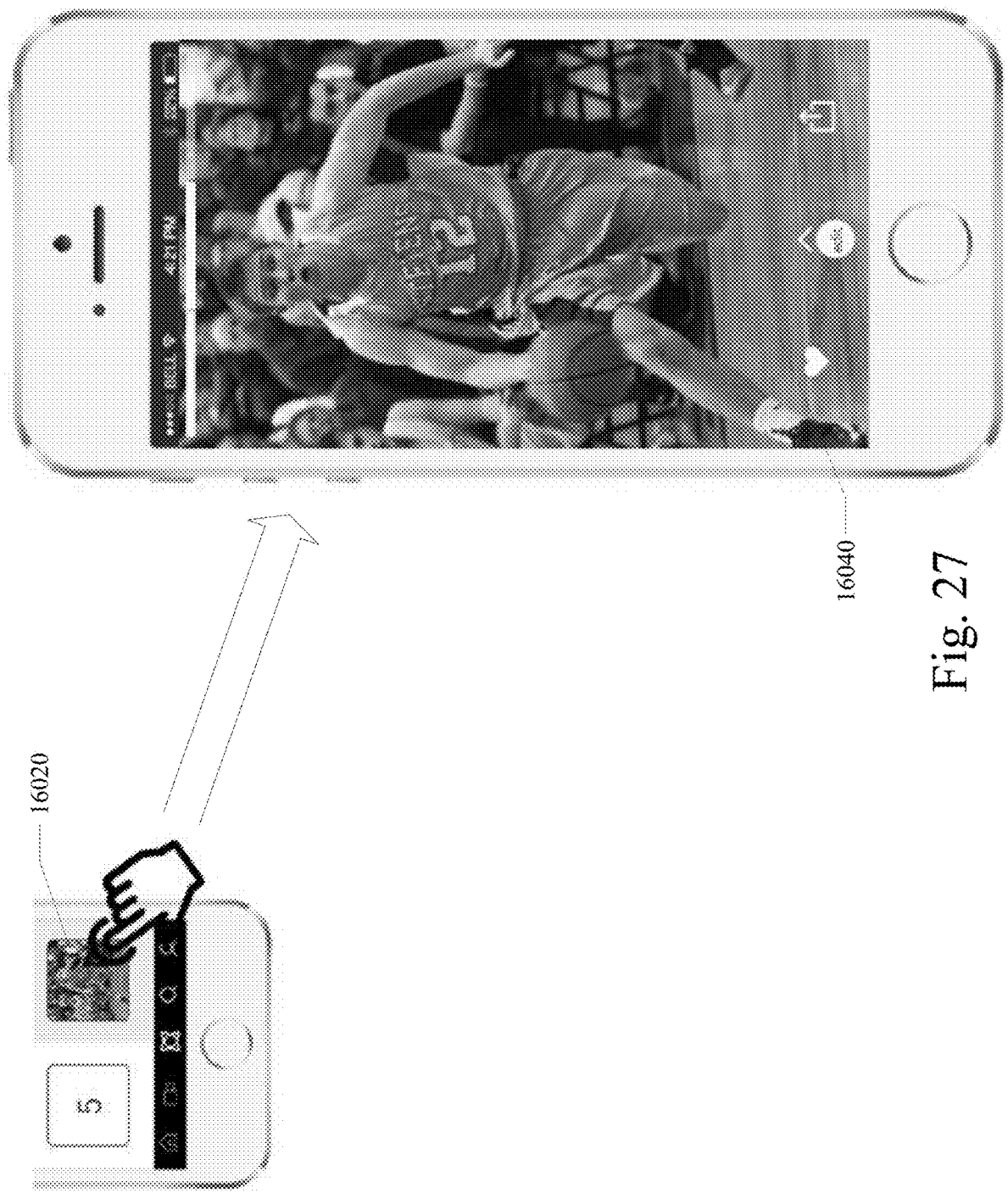
FIG. 27 illustrates an example user interface presentation of an example embodiment in which the user can play back highlights and angles of video streams captured at a particular event.

FIG. 27 illustrates an example user interface presentation of an example embodiment in which the user can play back highlights and angles of video streams captured at a particular event. As shown in FIG. 27, a user can tap on the thumbnail image 16020 and the user is taken to (allowed to view) the last highlight the user created and the highlight 16040 will start playing. The user can advance to the next angle of the same highlight by tapping the right side of the highlight image. The user can go back to the previous angle by tapping the left side of the highlight image. If the user was on the first angle and the user went back, the user would be taken to a home screen. Each highlight can have one camera angle and possibly more. The example embodiment will play through each angle chronologically and will automatically keep playing the highlights (and angles) in succession. If the playback is allowed to run on its own, the playback would finish the chronology of the highlights (and angles) and then go back to the home screen.

It is contemplated that the method and system for presenting game-related information may be combined with the independent content tagging of media files in order to provide highlights of interest at an event along with presentation of game-related information. For example, it is contemplated that a system for presenting game-related information may include an initiator device, a scoreboard display device, a camera device, and a cloud-based server device.

The initiator device may include a computing device, the computing device of the initiator device including a processor configured to execute one or more instructions configuring the computing device of the initiator device to present an input graphical user interface for receipt of game-related information by a user, each piece of game-related information including time-stamp information. The scoreboard display device may be operably connected to the initiator device and may be configured to present the game-related information from the initiator device. A camera device, such as a mobile phone, video camera, camcorder, and the like, may be configured to capture motion video.

The cloud-based server device may be operably connected to the initiator device. The cloud-based server device may include a computing device, the computing device of said cloud-based server device including a processor configured to execute one or more instructions configured for receipt and storage of each piece of the game-related information with the time-stamp information, the cloud-based server further configured to device configured to produce a portion of the media file from the motion video captured by the camera device and generate at least one meta-tag, wherein the meta-tag corresponds to a feature of an event; and combine the media file and the at least one meta-tag to produce the meta-tagged media file based on the correlated timing of the device time of the media-file generator and wherein the at least one meta-tag is generated implicitly based on an implicit meta-tag generation signal received from the user via the initiator device.

The system may include a receiver device, the receiver device including a computing device, the computing device of the receiver device including a processor configured to execute one or more instructions configuring the computing device of the receiver device to receive the game-related information from the cloud-based server device and the meta-tagged media file.

It is contemplated that the meta-tagged media file includes video highlights of a play of interest which may be displayed on the scoreboard display device.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be implemented (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be implemented, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the disclosure is defined by the appended claims.

What is claimed is:

1. A system for presenting game-related information, comprising:
   an initiator device, the initiator device including a computing device, the computing device of the initiator device including a processor configured to execute one or more instructions configuring the computing device of the initiator device to present an input graphical user interface for receipt of game-related information by a user, each piece of game-related information including time-stamp information;
   a scoreboard display device for a gym or arena, the scoreboard display device operably connected to said initiator device, the scoreboard display device configured to present the game-related information from the initiator device;
   a camera device configured to retrieve motion video; and
   a cloud-based server device operably connected to the initiator device, the cloud-based server device including a computing device, the computing device of said cloud-based server device including a processor configured to execute one or more instructions configured for receipt and storage of each piece of the game-related information with the time-stamp information, the cloud-based server further configured to device configured to produce a media file from the motion video captured by the camera device and generate at least one meta-tag, wherein the meta-tag corresponds to a feature of the event; and combine the media file and the at least one meta-tag to produce the meta-tagged media file based on the correlated timing of the device time of the media-file generator and wherein the at least one meta-tag is generated implicitly based on an implicit meta-tag generation signal received from the user via the initiator device, wherein the meta-tagged media file includes highlights of the play of interest which is displayed on the scoreboard display device.

2. The system as claimed in claim 1, further comprising: a receiver device, the receiver device including a computing device, the computing device of the receiver device including a processor configured to execute one or more instructions configuring the computing device of the receiver device to receive the game-related information from the cloud-based server device and the meta-tagged media file.

3. The system as claimed in claim 1, wherein the initiator device including the computing device, the computing device of the initiator device including the processor configured to execute the one or more instructions configuring the computing device of the initiator device to present the input graphical user interface for receipt of the game-related information by the user is operably connected to said scoreboard display device via a hard-wired connection.

4. The system as claimed in claim 1, wherein the initiator device including the computing device, the computing device of the initiator device including the processor configured to execute the one or more instructions configuring the computing device of the initiator device to present the input graphical user interface for receipt of the game-related information by the user is operably connected to said scoreboard display device via a wireless connection.

5. The system as claimed in claim 4, wherein the wireless connection is a BLUETOOTH connection or WIFI connection.

\* \* \* \* \*